United States Patent [19]
Willie et al.

[11] Patent Number: 6,052,724
[45] Date of Patent: Apr. 18, 2000

[54] METHOD AND SYSTEM FOR MANAGING A DIRECTORY SERVICE

[76] Inventors: David J. Willie, 442 Stonehedge Dr. #9F, Murray, Utah 84107; Cheng Yang, 2072 Calle Mesa Alta, Milpitas, Calif. 95035; Jay R. Cummings, 762 S. 850 East, Orem, Utah 84097; Kal A. Larsen, 1460 E. 330 South, Provo, Utah 84606

[21] Appl. No.: 08/922,207

[22] Filed: Sep. 2, 1997

[51] Int. Cl.⁷ .......................... G06F 17/30; G06F 15/173
[52] U.S. Cl. .......................... 709/223; 709/226; 707/10; 707/202; 707/203; 707/204
[58] Field of Search .............................. 707/10; 709/201, 709/223, 226, 202–204

[56] References Cited

U.S. PATENT DOCUMENTS

| | | | |
|---|---|---|---|
| 5,291,583 | 3/1994 | Bapat | 395/705 |
| 5,317,568 | 5/1994 | Bixby et al. | 370/401 |
| 5,317,742 | 5/1994 | Bapat | 709/300 |
| 5,331,642 | 7/1994 | Valley et al. | 714/705 |
| 5,471,617 | 11/1995 | Farrand et al. | 709/100 |
| 5,473,608 | 12/1995 | Gagne et al. | 370/401 |
| 5,491,694 | 2/1996 | Oliver et al. | 370/455 |
| 5,491,796 | 2/1996 | Wanderer et al. | 709/224 |
| 5,509,123 | 4/1996 | Dobbins et al. | 709/243 |
| 5,517,622 | 5/1996 | Ivanoff et al. | 709/232 |
| 5,522,042 | 5/1996 | Fee et al. | 709/226 |
| 5,541,911 | 7/1996 | Nilakantan et al. | 370/422 |
| 5,548,796 | 8/1996 | Ketchum | 710/52 |
| 5,559,958 | 9/1996 | Farrand et al. | 714/27 |
| 5,561,769 | 10/1996 | Kumar et al. | 709/202 |
| 5,566,160 | 10/1996 | Lo | 370/246 |
| 5,572,195 | 11/1996 | Heller et al. | 340/825.35 |
| 5,586,304 | 12/1996 | Stupek, Jr. et al. | 395/712 |
| 5,588,143 | 12/1996 | Stupek, Jr. et al. | 395/500.41 |
| 5,721,909 | 2/1998 | Oulid-Aissa et al. | 707/10 |
| 5,764,977 | 6/1998 | Oulid-Aissa et al. | 707/10 |
| 5,799,153 | 8/1998 | Blau et al. | 709/223 |
| 5,835,757 | 11/1998 | Oulid-Aissa et al. | 707/10 |
| 5,878,434 | 3/1999 | Draper et al. | 707/202 |

OTHER PUBLICATIONS

World Wide Web, SNMP Finds A New Home In Electronic Messaging Systems, Alex Cullen, Sep. 11, 1995.
IBM Research Report, Implementing OSI Agents for TMN, M. Feridun et al., Nov. 13, 1995.
Banyan Corp., SNMP Server Agent, date unknown.
Worldtalk Corportion, The NetJunction SNMP Manager and Agent, date unknown.
ISOCOR Solutions, Directory Services Products, date unknown.
University of Washington, Dept. of Computer Science and Engineering, A Study on Internet Management: SNMP and Internet MIB, Sai Lun Li, 1990.
Stanford University, Dept. of Computer Science, Real–time Database Experiences in Network Management Application, Yoshiaki Kiriha, Sep. 1995.
IBM Research Report, EMOSY: An SNMP Protocol Object Generator for the Protocol Independent MIB, Shyhtsun F. Wu, Nov. 5, 1992.
IEEE Globecom 1994, A Distributed Network Management System, Kwang–Hui Lee, 1994.
Integrated Network Management, II, OSI Management Information Base Implementation, Subodh Bapat, 1991.

(List continued on next page.)

*Primary Examiner*—Lehien Luu
*Assistant Examiner*—Ivan C. Pierce, III

[57] ABSTRACT

A method and system for managing a distributed directory service. The method includes defining a plurality of objects operative to maintain information about a plurality of partitions in a MIB, implementing the MIB in an agent, loading the agent on a managed server, interfacing the agent with a directory service, and sending a management request from a management station to the agent to access one of the objects. The MIB maintains information about each partition on the managed server, and allows access to such information through conventional network management software.

25 Claims, 13 Drawing Sheets

Microfiche Appendix Included
(2 Microfiche, 162 Pages)

OTHER PUBLICATIONS

Data Communications Magazine, MIB II Extends SNMP Interoperability, Chris VandenBerg, Oct. 1990.

IBM Research Report, Surfin Network Resources across the Web, Luca Deri, Feb. 5, 1996.

Singapore ICCS 1994, A Generic Manager/Agent Architecture for TMN Applications, J.T. Park & Y.H. Cho, 1994.

Integrated Network Management II, A multi–agent system for network management, Rahali et al., 1991.

Integrated Network Management II, SNMP for non–TCP/IP sub–networks: an implementation, Duato et al., 1991.

Integrated Network Management II, Design of the Mandate MIB, Haritsa et al., 1993.

Integrated Network Management II, MIB Design for Network Management Transaction Processing Shoichiro Nakai, 1993.

IEEE Communications Magazine, The OSI Model, The OSI Network Management Model, Nechiam Yemini, May, 1993.

IEEE Globecom 1993, A Protocol Architecture for Integrated Management of Local and Large Networks, Michel Colin et al., 1993.

IBM Research Report, On Implementing a Protocol Independent MIB, Shyhtsun F. Wu, Aug. 13, 1992.

IETF, X.500 Directory Monitoring MIB, Jun., 1996.

IEEE Milcom 1995, Remote Control of Diverse Network Elements Using SNMP, Aicklen et al., 1995.

IEEE Singapore International Conference on Networks/International Conference on Information Engineering 1995, *Design and Implementation of a Security Management System,* Song et al., Jul., 1995.

IEEE Globecom 1993, Network Management Information for System Control, Leon et al., 1993.

IEEE Globecom 1990, Network Management with Consistently Managed Objects, Wu et al., 1990.

IEEE Globecom 1993, Design and Implementation of a Configuration Management System, Kwang–Hui Lee, 1993.

IEEE Globecom 1995, Design and Implementation of TDX–10 Management System Incorporating TMN Concept, Park et al., 1995.

Novell Developer Notes, Understanding NetWare Directory Services, N. Crossen, Jan., 1995.

IETF Internet Draft, LDAP/CLDAP/X.500 Directory Services Monitoring MIB, Mar., 1997.

IETF, X.500 Directory Monitoring MIB, Jan., 1994.

Future MIBS, slide presented at Novell Brainshare presentation, Mar., 1997.

William Stallings, "SNMP, SNMPv2 and RMON: Practical Network Management, 2nd ed." Addison–Wesley, 1996.

Fig. 5

Partition Table 92
23.2.33.1.2

Partition Entry 2.1
Partition Entry 2.N

- Partition ID 2.N.1
- Partition Name 2.N.2
- Last Successful Partition Operation 2.N.3
- Last Successful Partition Operation Start Date Time 2.N.4
- Last Successful Partition Operation Stop Date Time 2.N.5
- Current Operation 2.N.6
- Current Operation Start Date Time 2.N.7
- Collision Count 2.N.8
- Last Collision Object Name 2.N.9
- Last Collision Rename 2.N.10
- Last Collision Date Time 2.N.11
- Object Count 2.N.12
- Replica Per Partition Count 2.N.13
- Last Entry Modification Time 2.N.14
- SAP Federated Name 2.N.15
- Start SAP Name Mode 2.N.16
- Partition Replica Number 2.N.17

Fig. 6

Replica Table ~93
23.2.33.1.3

Replica Entry 3.1
Replica Entry 3.N

- Partition Replica ID 3.N.1
- Replica Number 3.N.2
- Replica Server ID 3.N.3
- Replica State 3.N.4
- Replica Type 3.N.5
- Replica Successful Sync Date Time 3.N.6
- Successful In Bound Sync Count 3.N.7
- Successful Out Bound Sync Count 3.N.8
- Replica Fail Sync Date Time 3.N.9
- Replica Sync Fail Condition 3.N.10
- Replica Fail Sync Count 3.N.11
- Replica Server State 3.N.12
- In Bound Object Count 3.N.13
- Out Bound Object Count 3.N.14
- In Bound Sync Time 3.N.15
- Out Bound Sync Time 3.N.16

Fig. 7

Partitions Operations Table ~ 95
23.2.33.1.5

- Partitions Operation Entry 5.1
- Partitions Operation Entry 5.N
  - Partition Operations Index 3.N.1
  - Anonymous Binds 5.N.2
  - Simple Authenticated Binds 5.N.3
  - Strong Authenticated Binds 5.N.4
  - Bind Security Errors 5.N.5
  - Operation Forward to This DSA 5.N.6
  - Read Operations 5.N.7
  - Compare Operations 5.N.8
  - Add Entry Operations 5.N.9
  - Remove Entry Operations 5.N.10
  - Modify Entry Operations 5.N.11
  - Modify RDN Operations 5.N.12
  - List Operations 5.N.13
  - Search Operation 5.N.14
  - One Level Search Operations 5.N.15
  - Whole Tree Search Operation 5.N.16
  - Move Entry Operations 5.N.17
  - Type Referral Return 5.N.18
  - Transport Referral Return 5.N.19
  - Alias Referral Returned 5.N.20
  - Operations Forwarded 5.N.21
  - Operations Forwarded No Security 5.N.22
  - Operations Not Serviced Due to Error 5.N.23

6,052,724

METHOD AND SYSTEM FOR MANAGING A DIRECTORY SERVICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

A microfice appendix is attached. The total number of microfiche is 2 and the total number of frames is 162.

FIELD OF THE INVENTION

This invention relates to distributed directory services, and more particularly relates to management of distributed directory services using standard network management protocols.

BACKGROUND OF THE INVENTION

Networks have traditionally been relatively difficult to administer, especially as they grow in physical size and in the number of network-attached entities. One relatively recent advance in administering networks is the directory service. A directory service organizes network entities, such as users, printers, servers and the like into a manageable hierarchy, and simplifies overall management of such entities. The advantages of a good directory service has become such an important aspect of a network operating system that network operating systems are frequently purchased solely on the strength of their directory service capabilities.

A directory service typically organizes the network entities into a hierarchical tree structure, or directory, which can be graphically presented to visually illustrate the parent/child relationships between such entities. Some vendors' directory service products allow the distribution of the directory across various servers on a network. The ability to distribute a directory across several servers can reduce network traffic and access time by allowing an administrator to place heavily used portions of a directory on the servers from which they are most frequently accessed. Of course, a distributed directory service is typically more complex to administer than a non-distributed directory service.

One directory service product, NOVELL DIRECTORY SERVICES (NDS), refers to each node in the directory tree as an object, and categorizes each object in the tree as either a container object or a leaf object. A container object can be a parent to other container objects, and to zero or more leaf objects. Container objects are typically used to provide a logical organization to the tree, while the leaf objects represent actual network elements such as servers, printers, facsimile machines, and users. The directory can be divided into distinct portions, referred to as partitions, and each partition can be located on a different network server. Multiple copies of partitions can be made, and each copy of a partition is referred to as a replica. Thus, each partition has one or more replicas.

As is apparent, the software to implement such a distributed directory service can be quite complex. The directory service is responsible for splitting and joining partitions, making and synchronizing updates to replicas, providing a coherent view of the distributed directory to an administrator, providing a mechanism for adding, modifying and removing objects, and a host of other functions. While having a directory service eases the overall administration of a network, it still requires specialized training to understand when and how to split partitions, where to place the partitions, when and how to make replicas, how to organize the objects in a tree, and other administrative issues. Moreover, it is frequently necessary to monitor the directory service to uncover potential problems before they grow to the point that service is interrupted. Administration and monitoring are typically accomplished with vendor-supplied administration software specially developed for use with that vendor's directory service. Use of these tools typically requires special training of administration personnel. Such training can be expensive, and since vendors' directory service products differ from one another, training on one such product does not necessarily help in administering another vendor's directory service. Thus, transitioning from one vendor's directory service to another typically requires costly retraining.

The difficulty in administering a directory service also arises, to a lesser extent, in the management of individual network-attached devices. Years ago, network-attached devices typically came with their own software for monitoring and maintaining the device on the network. This required familiarity with many different programs, and as the average size of networks grew, this approach became unwieldy. To ease the management of such network-attached devices, management protocols, such as the Simple Network Management Protocol (SNMP), were established which created a uniform and standard protocol for managing devices on a network. Under SNMP, each managed device implements a Management Information Base (MIB), which is a database of managed objects associated with the managed device. Each managed object in the MIB is syntactically defined in a MIB listing. The MIB listing is used by management station software running on a computer to determine what objects are implemented in a particular managed device. Through the definitions of the objects in the MIB listing, the management station can generate and communicate to the managed device with SNMP GET, SET and GET NEXT requests, to view and/or modify, as appropriate, the objects in the managed device. Thus, SNMP defines a protocol which establishes a uniform mechanism for communicating with an agent associated with a network-attached device. One of the many advantages of such a uniform mechanism is that individuals familiar with SNMP and management station software can typically, at least to some extent, manage any SNMP-enabled device, without being specially trained to manage each respective device. Another advantage of using a standardized management protocol, such as SNMP, to manage devices, is that the use of such a standard management protocol ensures that software written to interact with the managed device will run on any network which supports the SNMP protocol.

At least one attempt has been made to simplify the management of a directory service through SNMP. The CCITT has published RFC 1567 which defines a MIB for use with X.500 compliant directory services. The RFC 1567 MIB defines several objects useful for maintaining summary statistics at the Directory Service Agent (DSA) level, but provides no objects or other means for monitoring or otherwise managing a directory service at a more detailed level which includes partitions, replicas, container objects and the like, and which can provide an administrator with object-level statistics regarding network usage. Moreover, the RFC 1567 MIB does not provide any mechanism for monitoring or otherwise managing other aspects of a directory service, such as the state of the DSA, or the various types of traffic and relative amounts of traffic handled by the directory service.

SUMMARY OF THE INVENTION

It is one object of this invention to provide a method and system which enables administration of a distributed directory service using standard network management protocols.

It is another object of this invention to provide a method and system for managing a distributed directory service which reduces the amount of training required to administer a distributed directory service.

It is yet another object of this invention to provide a method and system for managing a distributed directory service which uses standard network management protocols to generate notifications of events occurring within the distributed directory service.

Additional objects, advantages and other novel features of the invention will be set forth in part in the description that follows and, in part, will become apparent to those skilled in the art upon examination of the invention. To achieve the foregoing and other objects and in accordance with the purposes of the present invention as described above, a method and system for managing a directory service is provided. The directory maintained by the directory service preferably includes a plurality of partitions. A plurality of objects operative to maintain information about the plurality of partitions are defined in a Management Information Base (MIB). The plurality of objects can comprise a partition table object which maintains a row of objects for each partition on the managed server. Each row in the table can contain a partition operation object which is operative to maintain information identifying the last successful partition operation completed against a respective partition, and a current operation object which is operative to maintain information identifying a current operation being performed on a respective partition. The MIB is implemented in a network agent, and the agent is loaded on a managed server. The agent interfaces with a directory service module. Standard network management software can be used to interact with the agent by sending standard management requests to the agent, directing the agent to access one or more of the objects. The agent can retrieve information from the appropriate object, or change the appropriate object as a function of the request from the network management software.

According to another embodiment of this invention, a second plurality of objects which are operative to maintain information about replicas associated with the plurality of partitions are defined in the MIB. The second plurality of objects can be maintained in a replica table object, each row in the replica table object containing information regarding a respective replica. Each replica row can contain a replica state object operative to maintain a state of the respective replica, and a replica type object operative to maintain a type of the respective replica.

The MIB according to one embodiment of this invention contains a partition table which maintains information about each partition on the managed server, and a replica table which maintains information about each replica associated with each partition in the partition table. Each managed server in the distributed directory service preferably has its own agent and associated MIB. By using standard network management protocols, such as the Simple Network Management Protocol (SNMP), the method and system according to this invention can be used with any network management station software suitable for use in an SNMP environment. Thus, the method and system according to this invention provide a uniform interface suitable for administering a complex distributed directory with standard network management software.

A plurality of objects regarding the usage of the containers in the tree can be defined in the MIB. Preferably, a container usage table object is defined, which maintains a row of container usage objects for each container object. The objects can include a read operations object operative to maintain the number of times the container object has been read, and a write operations object operative to maintain the number of times the container object has been modified. Such low-level statistical information regarding container usage can be useful in determining how to partition a directory, and can help diagnose potential design problems.

According to another embodiment of this invention, the MIB includes a plurality of SNMP traps for providing information about events occurring within the directory service. Upon occurrence of a particular directory service event, the trap associated with the event is generated by the agent and can either be immediately communicated to the network management station, or can be stored and communicated when polled by the network management station. The ability to generate and communicate a trap associated with the occurrence of a distributed directory service event greatly reduces the need to continually monitor the directory service. Traps can also be used by external programs to keep apprised of the internal mechanisms of the directory service. Such traps can include, for example, a completed partition split trap operative to provide information related to the completion of a split partition operation, and a completed partition join trap operative to provide information relating to the completion of a join partition operation. Such traps can be communicated to other software programs and thus can be used by such software programs to synchronize other directory service related systems with the distributed directory service.

The method and system according to this invention use standard and well-known network management protocols to manage a complex distributed directory service, reducing the time and cost typically required to train an individual to administer such a directory service, and simplifying the usually complex programming required to interface with such a distributed directory service.

Still other objects of the present invention will become apparent to those skilled in this art from the following description wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principals of the invention. In the drawings:

FIG. 5 is a diagram illustrating in greater detail a portion of the MIB shown in FIG. 4;

FIG. 6 is a diagram illustrating in greater detail another portion of the MIB shown in FIG. 4;

FIG. 7 is a diagram illustrating in greater detail another portion of the MIB shown in FIG. 4;

Reference will now be made in detail to present preferred embodiments of the invention, examples of which are illustrated in the accompanying drawings, wherein like numerals indicate the same elements throughout the views.

DETAILED DESCRIPTION

The words 'container' and 'leaf' are used herein as those terms are used in the NOVELL DIRECTORY SERVICES (NDS) product, but are used merely to illustrate the invention and are not intended to limit the invention to directory services which use such terms. It is apparent that the invention has applicability to a variety of distributed directories, regardless of the terminology used to define entities in such systems.

Figure 1:
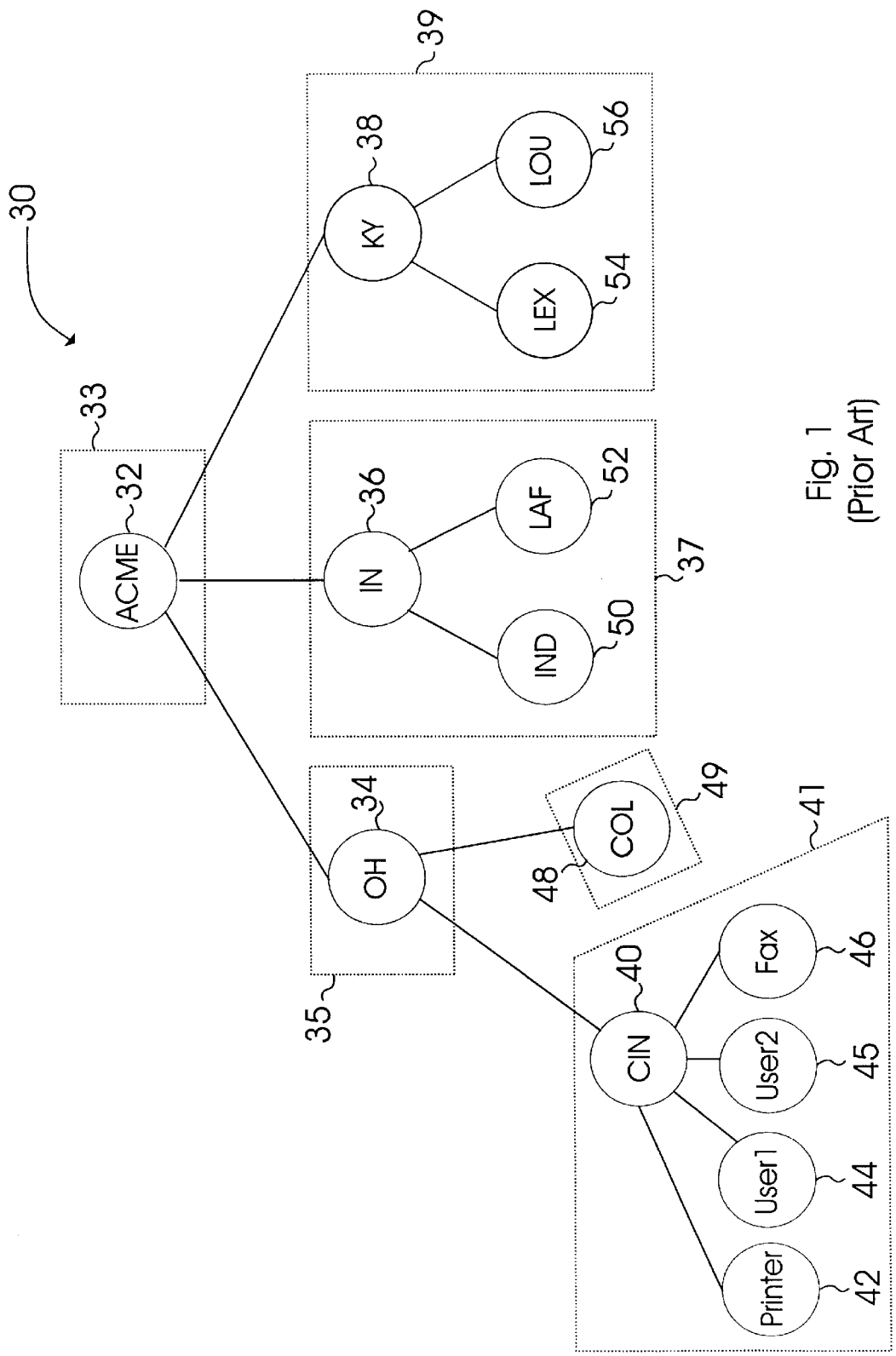
FIG. 1 is a schematic view of a distributed directory tree.

Referring now to the drawings, FIG. 1 is a schematic diagram of a distributed directory tree 30 illustrating a hierarchy of container and leaf objects which compose a distributed directory. A container object is used primarily to organize directory tree 30, and can contain other container objects, and/or leaf objects. Leaf objects represent network entities such as servers, printers, users and the like. Each object in directory tree 30 also has associated with it several different attributes which contain specific information about that object, such as its name, class, and description. A root container object 32 represents the top of the tree, and is named 'ACME' to represent that directory tree 30 relates to the ACME Company. Container object 32 contains a plurality of other container objects 34, 36 and 38, each of which represents a state in which the ACME Company has offices. Each of the state container objects has child objects which represent the cities in those states in which the company has offices, as represented by container objects 40, 48, 50, 52, 54 and 56. Although not shown, each of the container objects in directory tree 30 could have leaf objects, and at the city level (e.g., objects 40, 48, 50, 52, 54, and 56), each container object more than likely would have a plurality of leaf objects representing entities maintained at that location, such as leaf objects 42, 44, 45 and 46, which represent a printer, two users and a fax, respectively.

Although directory tree 30 could exist on a single network server, robust directory service products allow an administrator to divide directory tree 30 into several portions, sometimes referred to as partitions, and distribute each partition to a separate network server. One of the roles of the directory service is to maintain and provide a coherent view of the distributed directory tree 30. The ability to partition and distribute directory tree 30 provides several benefits, such as improved security, and greater overall throughput by physically separating the directory data onto different network servers, which allows heavily used partitions to be moved to separate servers. Moreover, if a particular server heavily uses a particular partition, the partition (or a copy thereof) can be physically moved to that server. Directory tree 30 can be partitioned many different ways, and the dashed boxes in FIG. 1 illustrate only one way in which directory tree 30 could potentially be partitioned. Each dashed box (e.g., 33, 35, 37, 39, 41 and 49) represents a separate partition of directory tree 30 and each such partition can be located on a separate network server.

Certain advanced distributed directory service products allow copies of partitions to be made. Such copies are frequently referred to as replicas. Each partition can have one or more replicas, and each replica is located on a different network server from the other replicas of that partition. Replication provides redundancy, and further increases the ability to duplicate portions of directory tree 30 to respond to potential performance problems associated with accessing directory tree 30. Such distributed directory services must maintain information about each partition and its replicas. Replicas can be designated as one of several types, such as a master replica, a read/write replica or a read-only replica. Each replica may contain hundreds or thousands of different container and leaf objects, as well as the attributes associated with these objects. It is apparent that a directory service must be able to maintain a vast amount of information for directory tree 30.

In addition to maintaining a large quantity of information, a distributed directory service must provide internal mechanisms for synchronizing the various replicas of a partition, providing a coherent view of the overall directory tree, and the processing associated with making, moving and/or deleting partitions and replicas. Such operations include splitting a single partition into multiple partitions, or creating a single partition from multiple partitions. These are only a few of the many different operations required by a distributed directory service.

Typically, each vendor of a distributed directory service provides a proprietary administration program designed to administer that vendor's distributed directory service. Training individuals to use the program can be time consuming, costly, and what is learned is usually not transferable to other administration programs as each vendor's administration program is different. Another problem relates to developing programs for use with the directory service. Vendors typically provide a proprietary interface which allows the development of additional programs which can interface with the directory service to provide additional functionality not offered by the directory service. Because each vendor typically uses a different interface, software programs written for a particular directory service frequently need to be substantially rewritten for use with other directory services.

Figure 2:
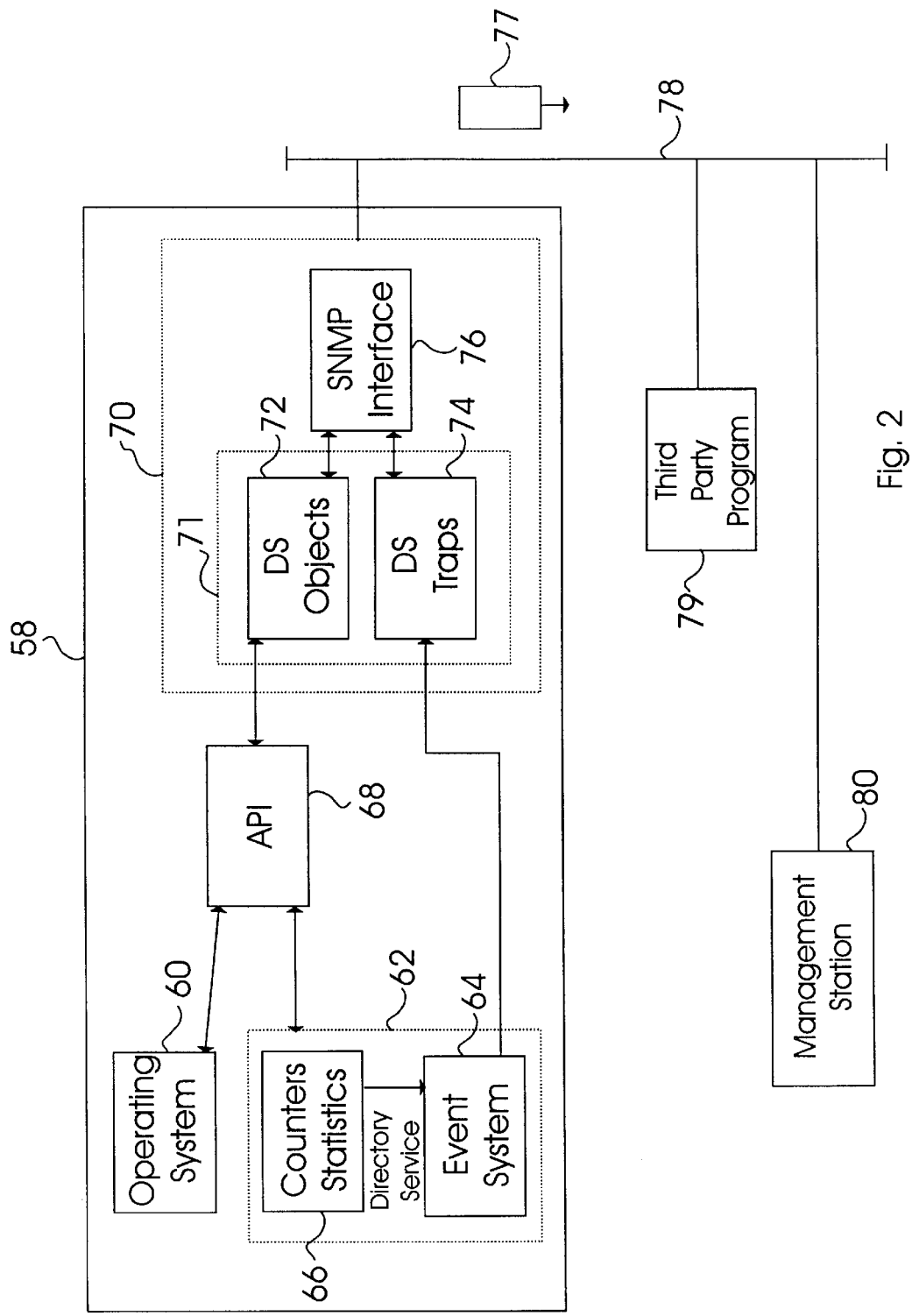
FIG. 2 is a block diagram illustrating a system for managing a distributed directory service according to one embodiment of this invention.

The method and system for managing a directory service according to this invention allows the management of a complex directory service through conventional network management station software, and allows developers to write software which interfaces with the directory service via conventional management station protocols. Referring now to FIG. 2, a directory service management system according to one embodiment of this invention is shown. A managed server 58 contains an agent 70 which communicates with a management station 80 over a network 78. The communication protocol between agent 70 and management station 80 can comprise any conventional network protocol, including for example, TCP/IP or SPX/IPX.

Managed server 58 can comprise any network computer, such as those available from IBM, COMPAQ, etc., running an operating system capable of supporting a directory service. Agent 70 is preferably a Simple Network Management Protocol (SNMP) agent which communicates with management station 80 using the SNMP protocol. However, it is apparent that other network management protocols, such as CMIP, could also be used. Agent 70 responds to GET, SET, and GET NEXT requests which it receives from management station 80. Management station 80 can comprise any computer upon which management station software, such as NOVELL MANAGEWISE or HEWLETT PACKARD OPENVIEW can execute, such as, for example, PC-compatible computers running WINDOWS operating system software. Network administrators typically use such management software to administer network-attached devices via the SNMP protocol.

Agent 70 implements a Management Information Base (MIB) 71 which contains objects related to the administration of a directory service 62. A MIB, in one sense, is a virtual data base in that the objects defined in the MIB may not exist in the agent itself, but may be located elsewhere, but are accessible by agent 70. However, to management station 80, the actual location of the objects is irrelevant, as it appears to management station 80 that each object is owned and controlled by agent 70.

Agent 70 can be developed using conventional SNMP development software, such as is provided in the NOVELL MANAGEWISE SDK CD Release 9, the contents of which are hereby incorporated herein. Such development environments typically include a MIB compiler that reads a MIB listing, which defines the objects in a MIB such as MIB 71, and generates software instructions suitable for defining and accessing such objects. These software instructions are incorporated into agent 70.

According to one embodiment of this invention, MIB 71 includes both objects and traps, and the objects are implemented in an object module 72, while the traps are implemented in a trap module 74. However, it is apparent that both the objects and the traps could be implemented in one integral software module. To ease the development of SNMP agents, some development systems, such as the MANAGEWISE SDK, separates the logic required to handle SNMP processing from the logic necessary to implement objects and traps. Thus, agent 70 also has an SNMP module 76 which includes the processing logic necessary to handle GET, SET, and GET-NEXT requests from management station 80. SNMP module 76 interfaces with object module 72 and trap module 74 via a predetermined interface defined by the MANAGEWISE SDK. This separation of processing login is provided merely as a convenience for a developer of an SNMP agent, and it is apparent that the invention described herein could be implemented such that the objects, traps and SNMP processing are handled in a single integral software module.

Directory service 62 can comprise any directory service, and preferably comprises a distributed directory service wherein the directory tree can be divided into partitions which can be located on different network servers. According to one embodiment of this invention, directory service 62 comprises NOVELL DIRECTORY SERVICES (NDS). Directory service 62 typically contains a data module 66 which contains the various counters and other data variables used by directory service 62 to maintain the status of the portion of the distributed directory on managed server 58, as well as certain information regarding partitions and replicas located on other network servers. The majority of the data associated with the objects in MIB 71 reside in data module 66. Thus, when agent 70 receives an SNMP request from management station 80, object module 72 accesses data module 66 to either modify the data in object module 66, or to retrieve data from object module 66 and communicate that data to management station 80. Agent 70 can interface with data module 66 either by directly invoking suitable functions in data module 66, or indirectly through, for example, an application programming interface (API) 68. One advantage of using API 68 is the degree of separation it provides from the specific implementation of data module 66. If access to data module 66 is maintained through API 68, data module 66 can be modified without regard to external software, such as agent 70, as long as API 68 is also modified to properly interface with data module 66. Thus, regardless of how data module 66 may be modified, agent 70 can continue to interface with data module 66 through API 68 without modification or recompilation. Because some of the objects implemented in MIB 71 may relate to other aspects of the network operating system, API 68 also interfaces with network operating system 60 to provide access to such data by agent 70.

Directory service 62 can also maintain an event system 64 for communicating events occurring within directory service 62 to external software modules. Event system 64, or other event mechanism, is typically provided in a directory service to allow software modules outside of the directory service to gain access to the various events occurring within the directory service. While event system 64 provides flexibility in allowing external software to gain access to events internal to directory service 62, such conventional event systems typically have a proprietary interface which renders the development of such external software more difficult, and precludes the use of the external software with other event systems. According to one embodiment of this invention, MIB 71 implements a plurality of SNMP traps, each of which corresponds to an event within event system 64, and upon the occurrence of one of such events the corresponding trap is generated which can either be spontaneously communicated to management station 80 or stored to await polling from management station 80. Using the standard SNMP protocol to provide event information to external software, such as management software, eliminates the need to write to a proprietary interface, decreasing the complexity of the software.

Access to the event information from event system 64 can be achieved with a registration and callback mechanism, as is known to those skilled in the art, or other suitable notification mechanism. Thus, trap module 74 registers with event system 64 to receive event notification for each event for which a corresponding trap has been defined. Upon the occurrence of any of such events, event system 64 notifies trap module 74, which in turn generates the appropriate trap.

Figure 3:
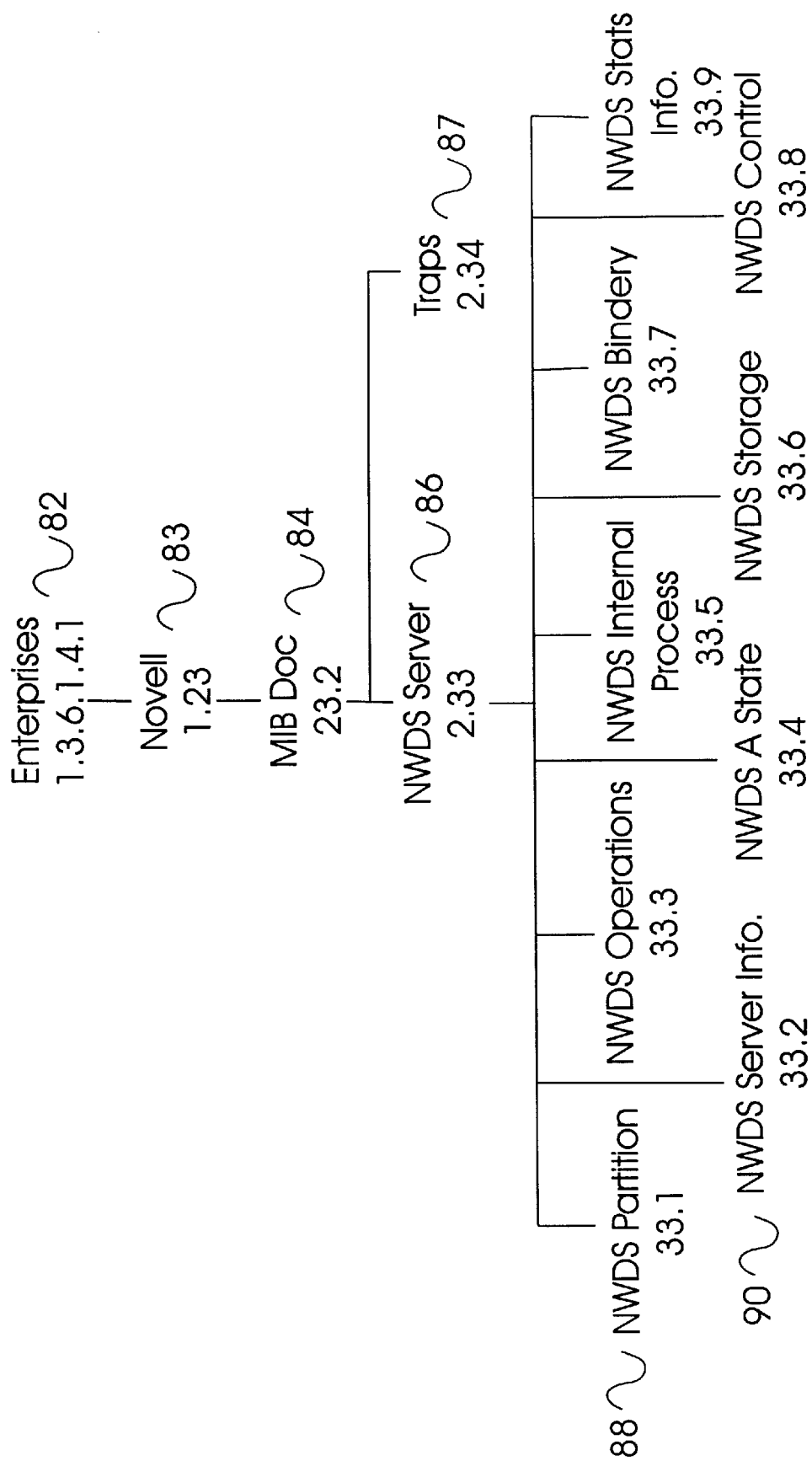
FIG. 3 is a diagram illustrating the hierarchical relationship of objects in a MIB according to one embodiment of this invention.

Referring now to FIG. 3, the objects defined in MIB 71 according to one embodiment of this invention will be described. Objects in a MIB are typically defined using a notation known as the American National Standards Institute (ANSI) ASN.1 syntax. Objects in an SNMP MIB are identified through the use of an object identifier, which comprises a series of digits separated by periods. For example, server object 86 has an object identifier of 1.3.6.1.4.1.23.2.33. Periods are field separators, with each field referring to a parent object in a hierarchy of objects. Thus, server object 86 is the 33rd child object of MIBDOC object 84, which has an object identifier of 1.3.6.1.4.1.23.2. Thus, each object identifier establishes a path through the MIB tree from the respective object to the root of the tree.

As is understood by those skilled in the art, the standard hierarchy of objects includes ISO, ORG, DOD, INTERNET, private, and enterprise objects (1.3.6.1.4.1).

Certain objects, such as group objects, are essentially "place holder" objects used to collect a group of related child objects. Server object 86 is such a group object. Server object 86 is a parent object to a plurality of child objects which relate to management of a distributed directory service on a particular managed server. The references herein to locations of objects is with respect to their location within the hierarchy of objects according to one embodiment of this invention, and in general could be located at practically any other location within MIB 71 without departing from the invention. For brevity, in the figures and specification, only the digits and periods of the object identifier which identify the object's immediate parent and the object's location at that level of the tree will be used.

Figure 4:
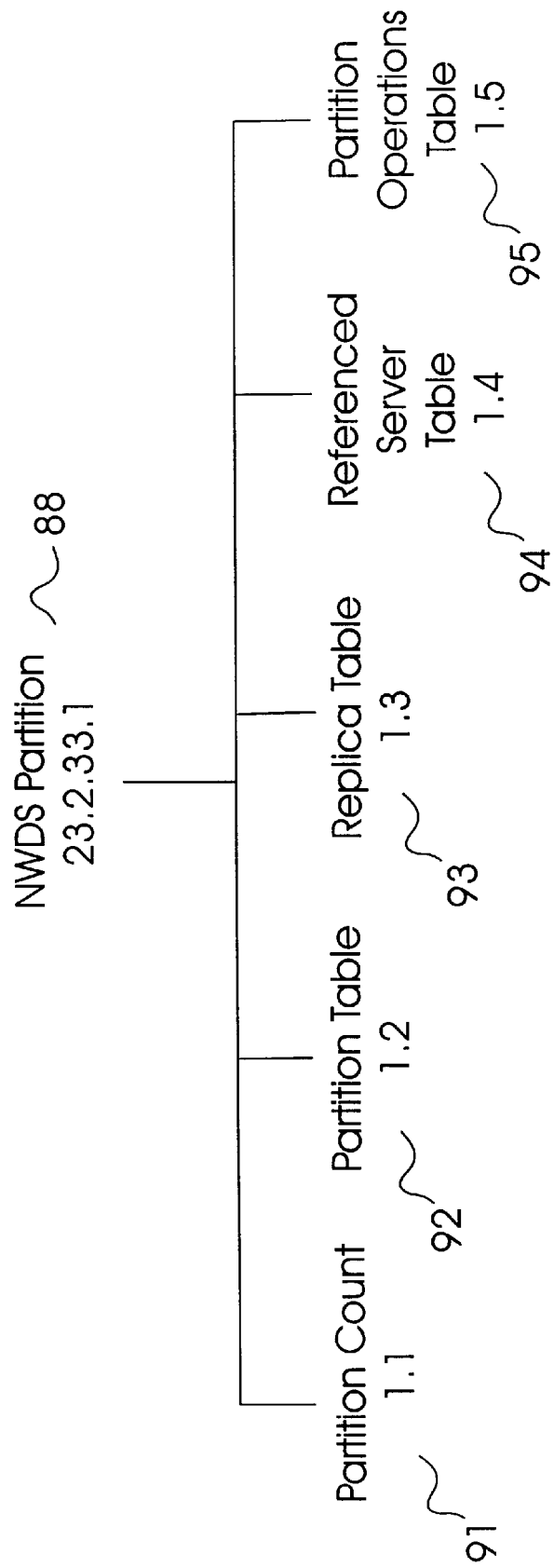
FIG. 4 is a diagram illustrating in greater detail a portion of the MIB shown in FIG. 3.

Server object 86 is a parent object to a plurality of child objects, such as partition object 88 and server info object 90, each of which are also group and thus parent objects to a plurality of child objects. Partition object 88 has a plurality of child objects, each of which relates to management of partitions on managed server 58. Referring now to FIG. 4, partition object 88 is a parent object to partition count object 91, partition table object 92, replica table object 93, referenced server table object 94, and partition operations table object 95. Partition count object 91 maintains the total number of partitions that reside on managed server 58. The formal ASN.1 syntax for partition count object 91 is as follows:

```
nwDSPartitionCount OBJECT-TYPE
    SYNTAX INTEGER
    ACCESS read-only
    STATUS mandatory
    DESCRIPTION
        "The total number of partitions that reside on this
        server."
    ::={nwDSPartition 1}
```

Referring now to FIG. 5, partition table object 92 contains a plurality of rows, or sequences, of objects relating to a particular partition on managed server 58. Each row of partition table object 92 includes a partition ID object, a partition name object, a last successful partition operation object, a last successful partition operation start date time object, a last successful partition operation stop date time object, a current operation object, a current operation start date time object, a collision count object, a last collision object name object, a last collision rename object, a last collision date time object, an object count object, a replica per partition count object, a last entry modification time object, a SAP federated name object, a start SAP name mode object, and a partition replica number object. The formal ASN.1 syntax for partition table object 92, according to one embodiment of this invention, is as follows:

```
--      DS Partition Table
nwDSPartitionTable OBJECT-TYPE
    SYNTAX SEQUENCE OF NwDSPartitionEntry
    ACCESS not-accessible
    STATUS mandatory
    DESCRIPTION
        "A list of all partitions that reside on this server."
    ::= { nwDSPartition 2 }
nwDSPartitionEntry OBJECT-TYPE
```

-continued

```
    SYNTAX nwDSPartitionEntry
    ACCESS not-accessible
    STATUS mandatory
    DESCRIPTION
        "The description of a particular partition
        in the partition table."
    INDEX {nwDSPartitionID}
    ::= { nwDSPartitionTable 1 }
nwDSPartitionEntry ::= SEQUENCE {
    nwDSPartitionID                     DsObjectID,
    nwDSPartitionName                   ObjectFullDistinquishedName,
    nwDSLastSuccessPartitionOperation   INTEGER,
    nwDSLastSuccessPartOperStartDateTime DateAndTime,
    nwDSLastSuccessPartOperStopDateTime  DateAndTime,
    nwDSCurrentOperation                INTEGER,
    nwDSCurrentOperationStartDateTime   DateAndTime,
    nwDSCollisionCount                  INTEGER,
    nwDSLastCollObjectName              ObjectFullDistinquishedName,
    nwDSLastColReName                   ObjectFullDistinquishedName,
    nwDSLastCollisionDateTime           DateAndTime,
    nwDSObjectCount                     INTEGER,
    nwDSReplicaPerPartitionCount        INTEGER,
    nwDSLastEntryModTime                DateAndTime,
    nwDSSapFederatedName                DisplayString,
    nwDSStartSapNameMode                INTEGER,
    nwDSPartReplicaNumber               INTEGER
}
nwDSPartitionID OBJECT-TYPE
    SYNTAX DsObjectID
    ACCESS read-only
    STATUS mandatory
    DESCRIPTION
        "The object ID which uniquely identifies a partition
        on this server and which maps as an index to
        the partition table."
    ::= { nwDSPartitionEntry 1 }
nwDSPartitionName OBJECT-TYPE
    SYNTAX ObjectFullDistinquishedName
    ACCESS read-only
    STATUS mandatory
    DESCRIPTION
        "The Distinguished Name of this partition."
    ::= { nwDSPartitionEntry 2 }
nwDSLastSuccessPartitionOperation OBJECT-TYPE
    SYNTAX INTEGER {
            idle(1),
            split(2),
            splitChild(3),
            joinUp(4),
            joinDown(5),
            moveSubTreeSource(6),
            moveSubTreeDestination(7),
            repairingTimeStamps(8),
            changingReplicaType(9)
            }
    ACCESS read-only
    STATUS mandatory
    DESCRIPTION
        "The last successful operation (such as delete, join,
        split, move, etc.) that was performed on this partition.
        Example: Deleted Partition1
        The initial value is 0."
    ::= { nwDSPartitionEntry 3 }
nwDSLastSuccessPartOperStartDateTime OBJECT-TYPE
    SYNTAX DateAndTime
    ACCESS read-only
    STATUS mandatory
    DESCRIPTION
        "The date and time when the last successful
        operation on this partition was initiated.
        The initial value is 0."
    ::= { nwDSPartitionEntry 4 }
nwDSLastSuccessPartOperStopDateTime OBJECT-TYPE
    SYNTAX DateAndTime
    ACCESS read-only
    STATUS mandatory
    DESCRIPTION
        "The date and time when the last successful
        operation on this partition was completed.
```

```
            The initial value is 0."
        ::= { nwDSPartitionEntry 5 }
    nwDSCurrentOperation OBJECT-TYPE
        SYNTAX INTEGER {
                    idle(1),
                    split(2),
                    splitChild(3),
                    joinUp(4),
                    joinDown(5),
                    moveSubTreeSource(6),
                    moveSubTreeDestination(7),
                    repairingTimeStamps(8),
                    changingReplicaType(9)
                }
        ACCESS read-only
        STATUS mandatory
        DESCRIPTION
            "The operation currently being performed on this partition
            (delete, join, split, move, etc.)."
        ::= { nwDSPartitionEntry 6 }
    nwDSCurrentOperationStartDateTime OBJECT-TYPE
        SYNTAX DateAndTime
        ACCESS read-only
        STATUS mandatory
        DESCRIPTION
            "The date and time when the current operation
            was initiated."
        ::= { nwDSPartitionEntry 7 }
    nwDSCollisionCount OBJECT-TYPE
        SYNTAX Counter
        ACCESS read-only
        STATUS mandatory
        DESCRIPTION
            "The total number of collisions that have occurred
            on this partition since NDSStats.NLM was loaded."
        ::= { nwDSPartitionEntry 8 }
    nwDSLastCollObjectName OBJECT-TYPE
        SYNTAX ObjectFullDistinquishedName
        ACCESS read-only
        STATUS mandatory
        DESCRIPTION
            "The report (by object name) of the last name collision."
        ::= { nwDSPartitionEntry 9 }
    nwDSLastColReName OBJECT-TYPE
        SYNTAX ObjectFullDistinquishedName
        ACCESS read-only
        STATUS mandatory
        DESCRIPTION
            "The report (by renamed object) of the last name collision."
        ::= { nwDSPartitionEntry 10 }
    nwDSLastCollisionDateTime OBJECT-TYPE
        SYNTAX DateAndTime
        ACCESS read-only
        STATUS mandatory
        DESCRIPTION
            "The date and time when the last name collision occurred."
        ::= { nwDSPartitionEntry 11 }
    nwDSObjectCount OBJECT-TYPE
        SYNTAX INTEGER
        ACCESS read-only
        STATUS mandatory
        DESCRIPTION
            "The total number of objects in this partition."
        ::= { nwDSPartitionEntry 12 }
    nwDSReplicaPerPartitionCount OBJECT-TYPE
        SYNTAX INTEGER
        ACCESS read-only
        STATUS mandatory
        DESCRIPTION
            "The total number of replicas of this partition."
        ::= { nwDSPartitionEntry 13 }
    nwDSLastEntryModTime OBJECT-TYPE
        SYNTAX DateAndTime
        ACCESS read-only
        STATUS mandatory
        DESCRIPTION
            "The date and time when an entry in the partition table
            was last modified. Initial value is 0."
        ::= { nwDSPartitionEntry 14 } nwDSSapFederatedName OBJECT-TYPE
        SYNTAX DisplayString(SIZE(0..48))
        ACCESS read-only
        STATUS mandatory
        DESCRIPTION
            "SAP and real federated names are the same."
        ::= { nwDSPartitionEntry 15 }
    nwDSStartSapNameMode OBJECT-TYPE
        SYNTAX INTEGER {
                    on(1),
                    off(2),
                    rootmost(3)
                }
        ACCESS read-write
        STATUS mandatory
        DESCRIPTION
            "The setting for Service Advertising (SAP)
            on this federated partition (on, off, or
            rootmost). When the setting is rootmost,
            only the rootmost partition object advertises."
        ::= { nwDSPartitionEntry 16 }
    nwDSPartReplicaNumber OBJECT-TYPE
        SYNTAX INTEGER
        ACCESS read-only
        STATUS mandatory
        DESCRIPTION
            "The replica number, which also maps as an index
            to the partition's replica table."
        ::= { nwDSPartitionEntry 17 }
    © 1997 Novell Inc.
```

The partition objects referred to above provide access to detailed information within directory service 62 regarding each partition on managed server 58 from a standard network management station. Such detailed information typically is not obtainable from conventional directory service products via a network management station. Moreover, this information can be accessed by other programs by using standard SNMP requests, simplifying the development effort required to access the data. For example, a conventional management station can query the last successful partition operation object to determine what the last successful operation against that partition was, and the current operation object to determine what the current operation, if any, is being performed against the respective partition. The replica count object can be queried to determine the number of replicas for a particular partition, and the object count object can be queried to determine the number of objects in the partition.

Referring to FIG. 6, replica table object 93 is a table which contains a plurality of rows, or sequences, of objects which relate to the replicas associated with the partitions identified in partition table object 92. This information includes not only replicas which exist on managed server 58, but also information regarding replicas on other network servers. Each row of replica table object 93 includes a partition replica ID object, a replica number object, a replica server ID object, a replica state object, a replica type object, a replica successful sync date time object, a successful inbound sync count object, a successful outbound sync count object, a replica fail sync date time object, a replica sync fail condition object, a replica fail sync count object, a replica server state object, an inbound object count object, an outbound object count object, an inbound sync time object, and an outbound sync time object. The formal ASN.1 syntax, according to one embodiment of this invention, for replica table object 93 is provided below:

```
--      DS Replica Table
nwDSReplicaTable OBJECT-TYPE
        SYNTAX SEQUENCE OF NwDSReplicaEntry
        ACCESS not-accessible
        STATUS mandatory
        DESCRIPTION
            "The list of all replicas of this partition
            that reside on other servers."
    ::= { nwDSPartition 3 }
nwDSReplicaEntry OBJECT-TYPE
        SYNTAX NwDSReplicaEntry
        ACCESS not-accessible
        STATUS mandatory
        DESCRIPTION
            "The description of a particular replica
            (in the replica table) that resides
            on this partition."
        INDEX {nwDSPartitionRepID,nwDSReplicaNumber}
    ::= { nwDSReplicaTable 1 }
NwDSReplicaEntry ::= SEQUENCE {
        nwDSPartitionRepID          DsObjectID,
        nwDSReplicaNumber           INTEGER,
        nwDSReplicaServerID         INTEGER,
        nwDSReplicaState            INTEGER,
        nwDSReplicaType             INTEGER,
        nwDSRepSuccessSyncDateTime              DateAndTime,
        nwDSSuccessInBoundSyncCount             Counter,
        nwDSSuccessOutBoundSyncCount            Counter,
        nwDSReplicaFailSyncDateTime             DateAndTime,
        nwDSReplicaFailCondition    INTEGER,
        nwDSReplicaFailSyncCount    INTEGER,
        nwDSReplicaServerState      INTEGER,
        nwDSInBoundObjectCount      Counter,
        nwDSOutBoundObjectCount     Counter,
        nwDSInBoundSyncTime         Counter,
        nwDSOutBoundSyncTime        Counter
}
nwDSPartitionRepID OBJECT-TYPE
        SYNTAX DsObjectID
        ACCESS read-only
        STATUS mandatory
        DESCRIPTION
            "The object ID that uniquely identifies a particular
            replica on this partition. This ID also maps as an
            index to the partition's replica table."
    ::= { nwDSReplicaEntry 1 }
nwDSReplicaNumber OBJECT-TYPE
        SYNTAX INTEGER
        ACCESS read-only
        STATUS mandatory
        DESCRIPTION
            "The number that uniquely identifies a particular replica
            on this partition. This number also maps as an index
            to this server's replica table."
    ::= { nwDSReplicaEntry 2 }
nwDSReplicaServerID OBJECT-TYPE
        SYNTAX INTEGER
        ACCESS read-only
        STATUS mandatory
        DESCRIPTION
            "The object ID that identifies the server on which
            this replica resides. This number also maps as an index
            to the reference server table (nwDSRefServerID)."
    ::= { nwDSReplicaEntry 3 }
nwDSReplicaState OBJECT-TYPE
        SYNTAX INTEGER {
                on(0),
                new(1),
                dying(2),
                locked(3),
                changereplicatype0(4),
                changereplicatype1(5),
                transition(6),
                split0(48),
                split1(49),
                join0(64),
                join1(65),
                join2(66),
                move0(80)
```

-continued

```
        }
        ACCESS read-only
        STATUS mandatory
        DESCRIPTION
            "The state of this replica (busy, on, join, etc.)."
    ::= { nwDSReplicaEntry 4 }
nwDSReplicaType OBJECT-TYPE
        SYNTAX INTEGER {
                master(0),
                readWrite(1),
                readOnly(2),
                subref(3)
        }
        ACCESS read-only
        STATUS mandatory
        DESCRIPTION
            "The type of this replica (master, read-write,
            read-only, or subordinate reference)."
    ::= { nwDSReplicaEntry 5 }
nwDSRepSuccessSyncDateTime OBJECT-TYPE
        SYNTAX DateAndTime
        ACCESS read-only
        STATUS mandatory
        DESCRIPTION
            "The date and time when this replica was last
            successfully synchronized."
    ::= { nwDSReplicaEntry 6 }
nwDSSuccessInBoundSyncCount OBJECT-TYPE
        SYNTAX Counter
        ACCESS read-only
        STATUS mandatory
        DESCRIPTION
            "The total number of times that in-bound synchronization
            was successful since NDSStats.NLM was loaded."
    ::= { nwDSReplicaEntry 7 }
nwDSSuccessOutBoundSyncCount OBJECT-TYPE
        SYNTAX Counter
        ACCESS read-only
        STATUS mandatory
        DESCRIPTION
            "The total number of times that out-bound synchronization
            was successful since NDSStats.NLM was loaded."
    ::= { nwDSReplicaEntry 8 }
nwDSReplicaFailSyncDateTime OBJECT-TYPE
        SYNTAX DateAndTime
        ACCESS read-only
        STATUS mandatory
        DESCRIPTION
            "The date and time when the last failure
            of replica synchronization occurred."
    ::= { nwDSReplicaEntry 9 }
nwDSReplicaSyncFailCondition OBJECT-TYPE
        SYNTAX INTEGER
        ACCESS read-only
        STATUS mandatory
        DESCRIPTION
            "The reason (error condition) that the last failure
            of replica synchronization occurred."
    ::= { nwDSReplicaEntry 10 }
nwDSReplicaFailSyncCount OBJECT-TYPE
        SYNTAX Counter
        ACCESS read-only
        STATUS mandatory
        DESCRIPTION
            "The total number of times that synchronization
            has failed since NDSStats.NLM was loaded."
    ::= { nwDSReplicaEntry 11 }
nwDSReplicaServerState OBJECT-TYPE
        SYNTAX INTEGER {
                unknown(0),
                down(1),
                up(2)
        }
        ACCESS read-only
        STATUS mandatory
        DESCRIPTION
            "The state of the server (up, down, unknown)
            on which this replica resides."
    ::= { nwDSReplicaEntry 12 }
```

-continued

```
nwDSInBoundObjectCount OBJECT-TYPE
    SYNTAX Counter
    ACCESS read-only
    STATUS mandatory
    DESCRIPTION
        "The count of all in-bound objects that have been
        synchronized since NDSStats.NLM was loaded."
    ::= { nwDSReplicaEntry 13 }
nwDSOutBoundObjectCount OBJECT-TYPE
    SYNTAX Counter
    ACCESS read-only
    STATUS mandatory
    DESCRIPTION
        "The count of all out-bound objects that have been
        synchronized since NDSStats.NLM was loaded."
    ::= { nwDSReplicaEntry 14 }
nwDSInBoundSyncTime OBJECT-TYPE
    SYNTAX Counter
    ACCESS read-only
    STATUS mandatory
    DESCRIPTION
        "The total time (in seconds) required for
        in-bound objects to synchronize."
    ::= { nwDSReplicaEntry 15 }
nwDSOutBoundSyncTime OBJECT-TYPE
    SYNTAX Counter
    ACCESS read-only
    STATUS mandatory
    DESCRIPTION
        "The total time (in seconds) for out-bound objects
        to synchronize."
    ::= { nwDSReplicaEntry 16 }
© 1997 Novell Inc.
```

As with partition table object 92, the objects in the rows of replica table object 93 can be accessed from conventional management station software. For example, the replica state object can be queried to determine the current state of a particular replica, and the replica type object can be accessed to determine the type of the respective replica. The partition replica ID object identifies the partition associated with the respective replica, and the replica server status object can be queried to determine the status of the server on which the replica exists.

Referring to FIG. 7, partition operations table object 95 contains a row, or sequence, of objects which maintain information about the operations performed against each partition on managed server 58. Each row of partition operations table 95 contains a partition operations index object, an anonymous binds object, a simple authenticated binds object, a strong authenticated binds object, a bind security errors object, an operation forward to this DSA object, a read operations object, a compare operations object, an add entry operations object, a remove entry operations object, a modify entry operations object, a modify RDN operations object, a list operations object, a search operation object, a one-level search operations object, a whole tree search operations object, a move entry operations object, a type referral return object, a transport referral return object, an alias referral returned object, an operations forwarded object, an operations forwarded no security object, and an operations not serviced due to error object. Thus, partition operations table 95 provides detailed directory service operations information for each partition on managed server 58. This information can be accessed by a conventional network management station and can be used to determine, for example, the total number of accesses to a public account, the number of read operations on a partition, and the total number of search operations performed on this partition. The formal ASN.1 syntax, according to one embodiment of this invention, for partition operations table object 95, is as follows:

```
--      Partition Operations Table
nwDSPartOperationsTable OBJECT-TYPE
    SYNTAX SEQUENCE OF NwDSPartOperationsEntry
    ACCESS not-accessible
    STATUS mandatory
    DESCRIPTION
        "A list of operations which have partition-level counters
        to record the total number of times each operation has
        been performed since NDSStats.NLM was loaded."
    ::= { nwDSPartition 5 }
nwDSPartOperationsEntry OBJECT-TYPE
    SYNTAX NwDSPartOperationsEntry
    ACCESS not-accessible
    STATUS mandatory
    DESCRIPTION
        "The description of an instance of a partition-level
        operation which has been performed and which is also
        indexed to this partition table entry."
    INDEX {nwDSPartitionOperationsIndex}
    ::= { nwDSPartOperationsTable 1 }
NwDSPartOperationsEntry ::= SEQUENCE {
    nwDSPartionOperationsIndex      DsObjectID,
    nwDSAnonymousBinds              Counter,
    nwDSSimpleAuthenticatedBinds    Counter,
    nwDSStrongAuthenticatedBinds    Counter,
    nwDSBindSecurityErrors          Counter,
    nwDSOperationForwardToThisDs    Counter,
    nwDSReadOperations              Counter,
    nwDSCompareOperations           Counter,
    nwDSAddEntryOperations          Counter,
    nwDSRemoveEntryOperations       Counter,
    nwDSModifyEntryOperations       Counter,
    nwDSModifyRDNOperations         Counter,
    nwDSListOperations              Counter,
    nwDSSearchOperation             Counter,
    nwDSOneLevelSearchOperation     Counter,
    nwDSWholeTreeSearchOperation    Counter,
    nwDSMoveEntryOperations         Counter,
    nwDSTypeReferralReturned        Counter,
    nwDSTransportReferralReturn     Counter,
    nwDSAliasReferralReturned       Counter,
    nwDSOperationsForwarded         Counter,
    nwDSOperForwardNoSecurity       Counter,
    nwDSOperNotServDueToError       Counter
}
nwDsPartitionOperationsIndex OBJECT-TYPE
    SYNTAX DsObjectID
    ACCESS read-only
    STATUS mandatory
    DESCRIPTION
        "The object ID that uniquely identifies this partition
        and which also maps as an index to the partition table."
    ::= { nwDSPartOperationsEntry 1 }
nwDSAnonymousBinds OBJECT-TYPE
    SYNTAX Counter
    ACCESS read-only
    STATUS mandatory
    DESCRIPTION
        "Anonymous binds (the total number of binds to any account
        that does not have a password)."
    ::= { nwDSPartOperationsEntry 2 }
nwDSSimpleAuthenticatedBinds OBJECT-TYPE
    SYNTAX Counter
    ACCESS read-only
    STATUS mandatory
    DESCRIPTION
        "The total number of binds made with bindery authentication
        since NDSStats.NLM was loaded."
    ::= { nwDSPartOperationsEntry 3 }
nwDSStrongAuthenticatedBinds OBJECT-TYPE
    SYNTAX Counter
    ACCESS read-only
    STATUS mandatory
    DESCRIPTION
        "The total number of binds made
        with NDS-authenticated connections
        since NDSStats.NLM was loaded."
```

-continued

```
    ::= { nwDSPartOperationsEntry 4 }
nwDSBindSecurityErrors OBJECT-TYPE
    SYNTAX Counter
    ACCESS read-only
    STATUS mandatory
    DESCRIPTION
        "Any failed attempt to validate a connection.
        Security errors include failures because of invalid
        login name, bad password, or insufficient rights."
    ::= { nwDSPartOperationsEntry 5 }
nwDSOperationForwardToThisDSA OBJECT-TYPE
    SYNTAX Counter
    ACCESS read-only
    STATUS mandatory
    DESCRIPTION
        "A request from the Directory User Agent (DUA) or client
[either/or serving as?]
        or another Directory Service Agent (DSA)."
    ::= { nwDSPartOperationsEntry 6 }
nwDSReadOperations OBJECT-TYPE
    SYNTAX Counter
    ACCESS read-only
    STATUS mandatory
    DESCRIPTION
        "The total number of read operations performed
        in this partition since NDSStats.NLM was loaded."
    ::= { nwDSPartOperationsEntry 7 }
nwDSCompareOperations OBJECT-TYPE
    SYNTAX Counter
    ACCESS read-only
    STATUS mandatory
    DESCRIPTION
        "The total number of compare operations performed
        in this partition since NDSStats.NLM was loaded."
    ::= { nwDSPartOperationsEntry 8 }
nwDSAddEntryOperations OBJECT-TYPE
    SYNTAX Counter
    ACCESS read-only
    STATUS mandatory
    DESCRIPTION
        "The total number of entries that were created (added)
        in this partition since NDSStats.NLM was loaded."
    ::= { nwDSPartOperationsEntry 9 }
nwDSRemoveEntryOperations OBJECT-TYPE
    SYNTAX Counter
    ACCESS read-only
    STATUS mandatory
    DESCRIPTION
        "The total number of entries that were deleted
        in this partition since NDSStats.NLM was loaded."
    ::= { nwDSPartOperationsEntry 10 }
nwDSModifyEntryOperations OBJECT-TYPE
    SYNTAX Counter
    ACCESS read-only
    STATUS mandatory
    DESCRIPTION
        "The total number of entries that were modified
        in this partition since NDSStats.NLM was loaded."
    ::= { nwDSPartOperationsEntry 11 }
nwDSModifyRDNOperations OBJECT-TYPE
    SYNTAX Counter
    ACCESS read-only
    STATUS mandatory
    DESCRIPTION
        "Sum of modify RDN and Modify DN operations
        (changing the name of an object or the name
        of one of its parents) since NDSStats.NLM
        was loaded."
    ::= { nwDSPartOperationsEntry 12 }
nwDSListOperations OBJECT-TYPE
    SYNTAX Counter
    ACCESS read-only
    STATUS mandatory
    DESCRIPTION
        "The total number of list operations performed
        in this container or partition since
        NDSStats.NLM was loaded."
    ::= { nwDSPartOperationsEntry 13 }
nwDSSearchOperation OBJECT-TYPE
    SYNTAX Counter
    ACCESS read-only
    STATUS mandatory
    DESCRIPTION
        "Sum of search operations (subtree, one-level,
        and object searches) that have been performed
        in this container or partition since
        NDSStats.NLM was loaded."
    ::= { nwDSPartOperationsEntry 14 }
nwDSOneLevelSearchOperation OBJECT-TYPE
    SYNTAX Counter
    ACCESS read-only
    STATUS mandatory
    DESCRIPTION
        "The total number of one-level search operations
        performed in this partition since NDSStats.NLM
        was loaded."
    ::= { nwDSPartOperationsEntry 15 }
nwDSWholeTreeSearchOperation OBJECT-TYPE
    SYNTAX Counter
    ACCESS read-only
    STATUS mandatory
    DESCRIPTION
        "The total number of subtree-level search operations
        performed in this partition since NDSStats.NLM
        was loaded."
    ::= { nwDSPartOperationsEntry 16 }
nwDSMoveEntryOperations OBJECT-TYPE
    SYNTAX Counter
    ACCESS read-only
    STATUS mandatory
    DESCRIPTION
        "The total number of times the [operations?] entry
        was moved since NDSStats.NLM was loaded."
    ::= { nwDSPartOperationsEntry 17 }
nwDSTypeReferralReturned OBJECT-TYPE
    SYNTAX Counter
    ACCESS read-only
    STATUS mandatory
    DESCRIPTION
        "The total number of times a partition type [mixed - up]
        (such as master, read-write, read-only)
        referral was returned since NDSStats.NLM
        was loaded. For example, a modify request
        to a read-only partition could return
        a referral to a writable copy."
    ::= { nwDSPartOperationsEntry 18 }
nwDSTransportReferralReturn OBJECT-TYPE
    SYNTAX Counter
    ACCESS read-only
    STATUS mandatory
    DESCRIPTION
        "The total number of times a transport type
        (such as ipx, ip, appletalk) referral was returned
        since NDSStats.NLM was loaded."
    ::= { nwDSPartOperationsEntry 19 }
nwDSAliasReferralReturned OBJECT-TYPE
    SYNTAX Counter
    ACCESS read-only
    STATUS mandatory
    DESCRIPTION
        "The total number of times an alias referral
        was returned since NDSStats.NLM was loaded.
        For example, a request for object 'Bill'
        (an alias for 'William') could return a referral
        to 'William's location."
    ::= { nwDSpartOperationsEntry 20 }
nwDSOperationsForwarded OBJECT-TYPE
    SYNTAX Counter
    ACCESS read-only
    STATUS mandatory
    DESCRIPTION
        "The total number of operations forwarded
        to another DSA (Directory Services Agent).
        Not currently implemented."
    ::= { nwDSPartOperationsEntry 21 }
nwDSOperForwardNoSecurity OBJECT-TYPE
    SYNTAX Counter
    ACCESS read-only
```

```
        STATUS mandatory
        DESCRIPTION
            "The total number of operations forwarded
            to this DSA (Directory Services Agent)
            that do not meet security requirements.
            For example, operations fail without
            sufficient object rights."
        ::= { nwDSPartOperationsEntry 22 }
nwDSOperNotServDueToError OBJECT-TYPE
        SYNTAX Counter
        ACCESS read-only
        STATUS mandatory
        DESCRIPTION
            "The total number of operations that were not serviced
            because of errors other than security. For example,
            requesting information on an object that does not exist."
        ::= { nwDSPartOperationsEntry 23 }
© 1997 Novell Inc.
```

Figure 8:
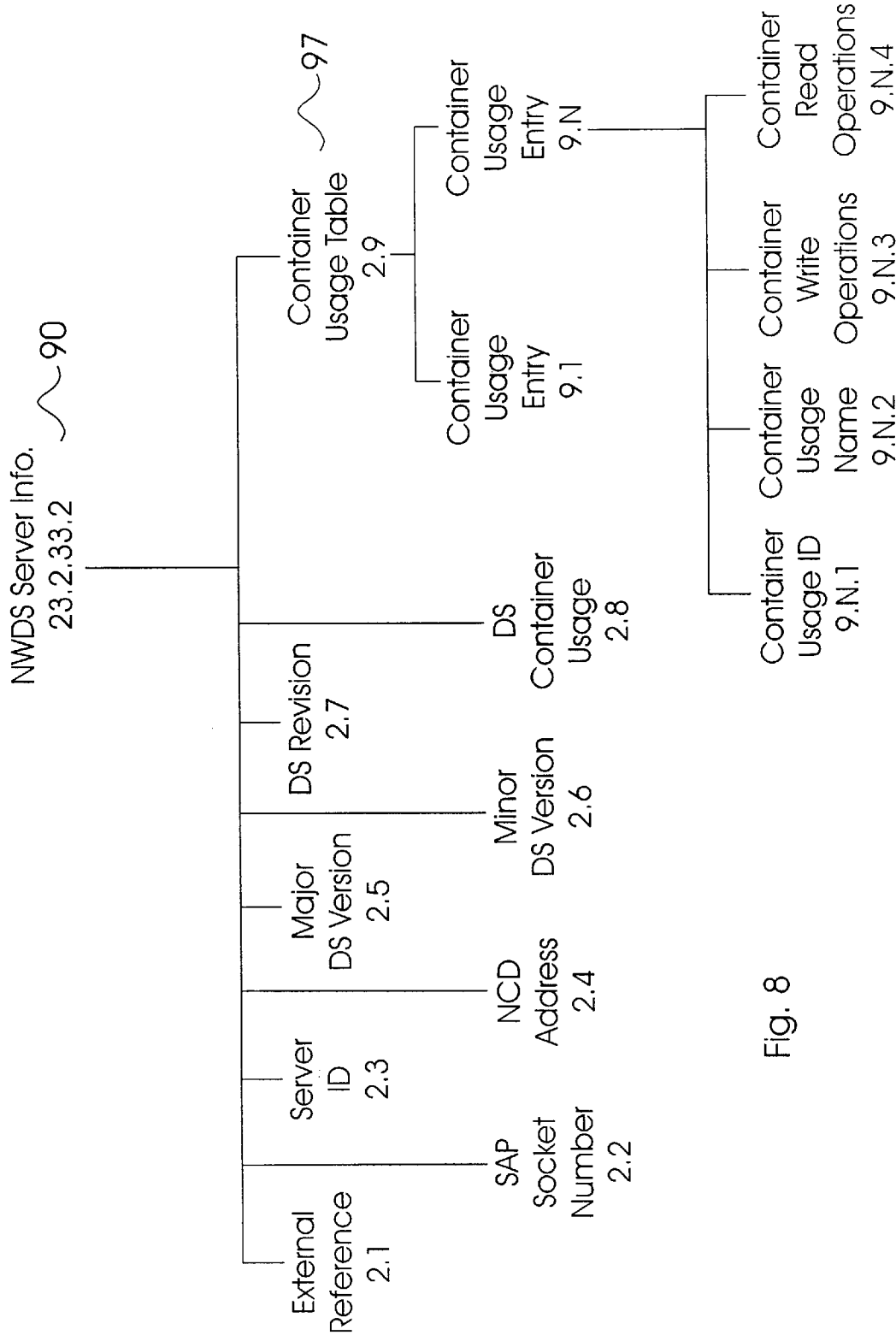
FIG. 8 is a diagram illustrating in greater detail another portion of the MIB shown in FIG. 3.

Referring now to FIG. 8, server info object 90 contains an external reference object, a SAP socket number object, a server ID object, an NCP address object, a major DS version object, a minor DS version object, a DS revision object, a DS container usage object, and a container usage table object 97. Thus, server info object 90 is a group object which contains general information about directory service 62, as well as a table with information about container objects. Container usage table object 97 contains a row, or sequence, of objects for each container object in the partitions located on managed server 58. Each row in container usage table object 97 includes a container usage ID object, a container usage name object, a container write operations object, and a container read operations object. Such information can be accessed by either conventional network management software, or by any other software through conventional SNMP requests. The detailed information in container usage table object 97 regarding each container on managed server 58 enables an administrator to quickly determine which containers are most heavily utilized. Based on such usage, an administrator can determine the optimal partitioning and partition locations of the directory tree. The formal ASN.1 syntax for server info object 90, according to one embodiment of this invention, is as follows:

```
--      DS Server Info Group
--
nwDSExternRef OBJECT-TYPE
        SYNTAX INTEGER
        ACCESS read-only
        STATUS mandatory
        DESCRIPTION
            "The total number of referenced objects
            that are not located on this server
            at the time the request was issued."
        ::= { nwDSServerInfo 1 }
nwDSSapSocketNum OBJECT-TYPE
        SYNTAX INTEGER
        ACCESS read-only
        STATUS mandatory
        DESCRIPTION
            "SAP socket number (4-byte integer)."
        ::= { nwDSServerInfo 2 }
nwDSServerID OBJECT-TYPE
        SYNTAX DsObjectID
        ACCESS read-only
        STATUS mandatory
        DESCRIPTION
            "The object ID that uniquely identifies a server
            in the server reference table and which also maps
            as an index into this table."
        ::= { nwDSServerInfo 3 }
nwDSNcpAddress OBJECT-TYPE
        SYNTAX IPXNetNumber
        ACCESS read-only
        STATUS mandatory
        DESCRIPTION
            "NDS NCP Address"
        ::= { nwDSServerInfo 4 }
nwMajorDSVersion OBJECT-TYPE
        SYNTAX INTEGER
        ACCESS read-only
        STATUS mandatory
        DESCRIPTION
            "NDS major version. Example: 4."
        ::= { nwDSServerInfo 5 }
nwMinorDSVersion OBJECT-TYPE
        SYNTAX INTEGER
        ACCESS read-only
        STATUS mandatory
        DESCRIPTION
            "NDS minor version. Example: .11."
        ::= { nwDSServerInfo 6 }
nwDSRevision OBJECT-TYPE
        SYNTAX INTEGER
        ACCESS read-only
        STATUS mandatory
        DESCRIPTION
            "NDS revision number. Example: 397."
        ::= { nwDSServerInfo 7 }
nwDSContainerUsage OBJECT-TYPE
        SYNTAX INTEGER
        ACCESS read-write
        STATUS mandatory
        DESCRIPTION
            "A 32-bit flag that controls the collection of data
            according to the following constants:
            DSS_TRK_PARTITIONS-0x00000001,
            DSS_TRK_CONTAINERS-0x00000002,
            DSS_TRK_ENTRIES-0x00000004,
            DSS_TRK_XREFS-0x00000008,
            DSS_TRK_CONDCODES-0x00000010,
            DSS_TRK_LASTCCODES-0x00000020,
            The default is set to monitor container usage,
            which is all of the above bits. This value
            can be set as to start monitoring container usage
            or any
            of the [other bits] can be set to monitor these types."
        ::= { nwDSServerInfo 9 }
--      DS Container Usage Table
--
nwDSContainerUsageTable OBJECT-TYPE
        SYNTAX SEQUENCE OF NwDSContainerUsageEntry
        ACCESS not-accessible
        STATUS mandatory
        DESCRIPTION
            "A list of containers on this server
            that have been written to or read from
            since NDSStats.NLM was loaded."
        ::= { nwDSServerInfo 10 }
nwDSContainerUsageEntry OBJECT-TYPE
        SYNTAX NwDSContainerUsageEntry
        ACCESS not-accessible
        STATUS mandatory
        DESCRIPTION
            "A container-level read or write operation
            which has been performed and which is indexed
            to nwDSContainerUsageEntry"
        INDEX {nwContainerUsageID}
        ::= { nwDSContainerUsageTable 1 }
NwDSContainerUsageEntry ::= SEQUENCE {
        nwContainerUsageID          DsObjectID,
        nwContainerUsageName        DisplayString,
        nwContainerWriteOperations  Counter,
        nwContainerReadOperations   Counter
        }
nwContainerUsageID OBJECT-TYPE
        SYNTAX DsObjectID
```

-continued

```
    ACCESS read-only
    STATUS mandatory
    DESCRIPTION
        "A object ID that uniquely identifies
        this container in this [partition, server, tree?]."
    ::= { nwDSContainerUsageEntry 1 }
nwContainerUsageName OBJECT-TYPE
    SYNTAX DisplayString
    ACCESS read-only
    STATUS mandatory
    DESCRIPTION
        "The Relative Distinguished Name (RDN)
        for container usage."
    ::= { nwDSContainerUsageEntry 2 }
nwContainerWriteOperations OBJECT-TYPE
    SYNTAX Counter
    ACCESS read-only
    STATUS mandatory
    DESCRIPTION
        "Container usage. The total number of write operations
        performed on this container since NDSStats.NLM
        was loaded."
    ::= { nwDSContainerUsageEntry 3 }
nwContainerReadOperations OBJECT-TYPE
    SYNTAX Counter
    ACCESS read-only
    STATUS mandatory
    DESCRIPTION
        "Container usage. The total number of read operations
        performed on this container since NDSStats.NLM
        was loaded."
    ::= { nwDSContainerUsageEntry 4 }
© 1997 Novell Inc.
```

The formal ASN.1 syntax for other objects defined in MIB 71 are disclosed in the accompanying microfiche.

Figure 9:
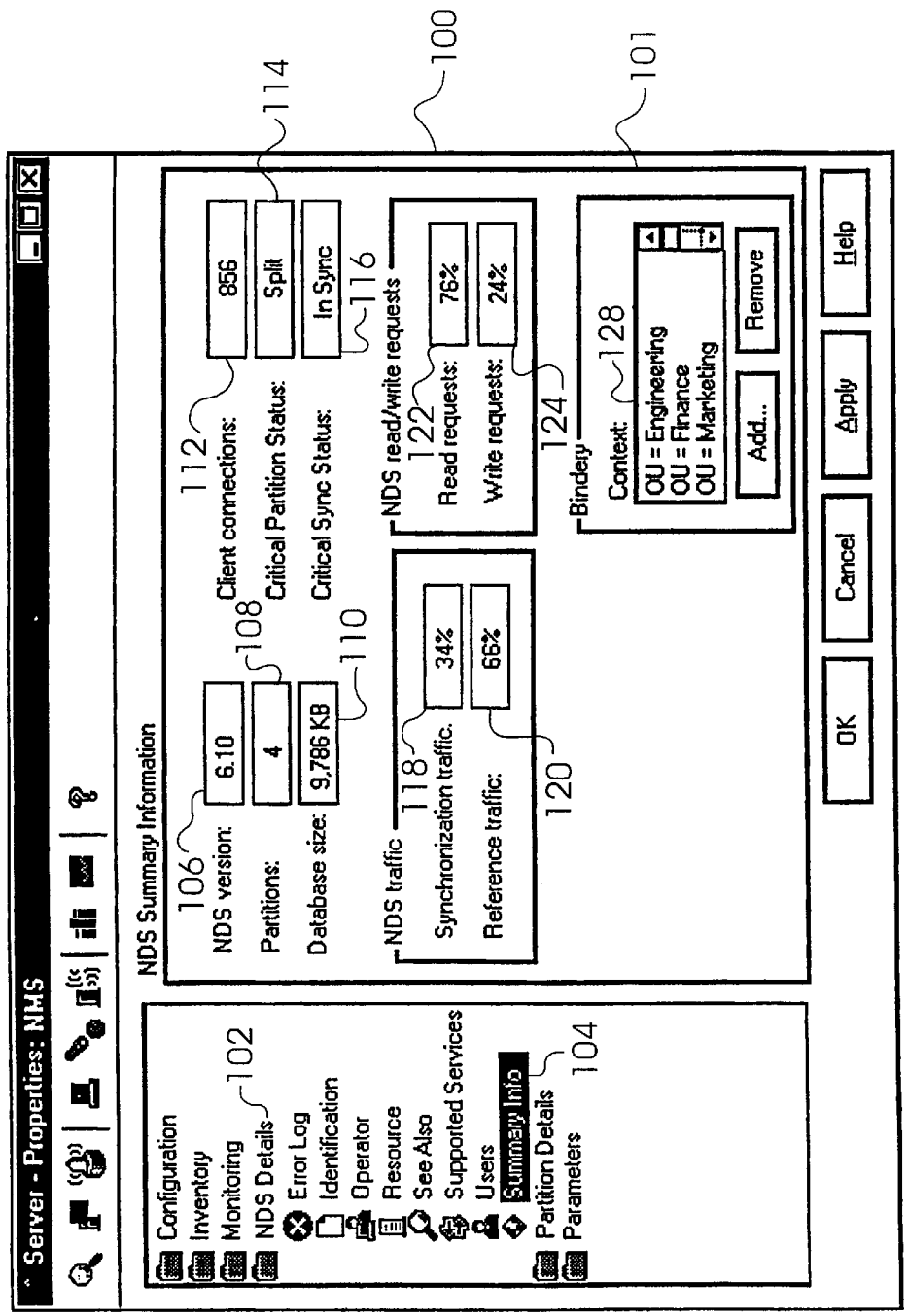
FIG. 9 is a user interface window showing summary information obtained from the MIB according to one embodiment of this invention.

Because MIB 71 provides access to internal information of directory service 62 through standard protocols, software can be rapidly developed which can access and display such information to help in administering directory service 62. Such software can be standalone software, or can be written as a 'plug-in' to conventional management station software. FIG. 9 shows a user interface window 100 according to one embodiment of this invention. Selecting item 104 in folder 102 causes the information in window 101 to be displayed. Window 101 contains summary information about directory service 62 on managed server 58. The object names from which the information originates are provided after the description of each field. The description and formal ASN.1 syntax of the object names are reflected in the attached microfiche. Field 106 contains the version of directory service 62 which is currently running on managed server 58. This information can be obtained from the nwMajorDSVersion and nwMinorDSVersion objects. Field 108 contains the number of partitions on managed server 58. This information can be obtained from the nwDSPartitionCount object. Field 110 contains the size of the distributed directory tree maintained on managed server 58 (referred to in FIG. 9 as a database). This information can be obtained from the nwDSSizeOfNDSDataBase object. Field 112 contains the number of client connections on managed server 58. This information can be obtained from the nwDSAClientCount object. Field 114 contains a critical partition status, which reflects the most critical status of any partition on managed server 58. This information can be obtained by analyzing the nwDSCurrentOperation object of each partition on managed server 58. Field 116 contains a critical synchronization status, which reflects the most critical status of the synchronization of the replicas on managed server 58. This information can be obtained by analyzing the nwDSRepSuccessSyncDateTime and the nwDSReplicaFailSyncDateTime objects for each replica to determine if the replica has successfully synchronized. Field 118 contains the percentage of traffic on managed server 58 which relates to synchronization. This information can be obtained from the following calculation: (nwDSSyncReply+nwDSSyncRequest)/(nwDSSyncReply+nwDSSyncRequest+nwDSOtherRequests+nwDSOtherReply)*100. Field 120 contains the percentage of traffic on managed server 58 which relates to reference traffic, which is any type of traffic not relating to synchronization. This information can be obtained from the following calculation: (nwOtherRequests+nwDSOtherReply)/(nwDSSyncReply+nwDSSyncRequest+nwDSOtherRequests+nwDSOtherReply)*100. Field 122 contains the percentage of read requests. This information can be obtained from the following calculation: nwDSReadReq/(nwDSReadReq+nwDSWriteReq)*100. Field 124 contains the percentage of write requests. This information can be obtained from the following calculation: nwDSWriteReq/(nwDSReadReq+nwDSWriteReq)*100. Field 128 contains a list of bindery contexts. This information can be obtained from the nwDSBinderyContextTable object.

Figure 10:
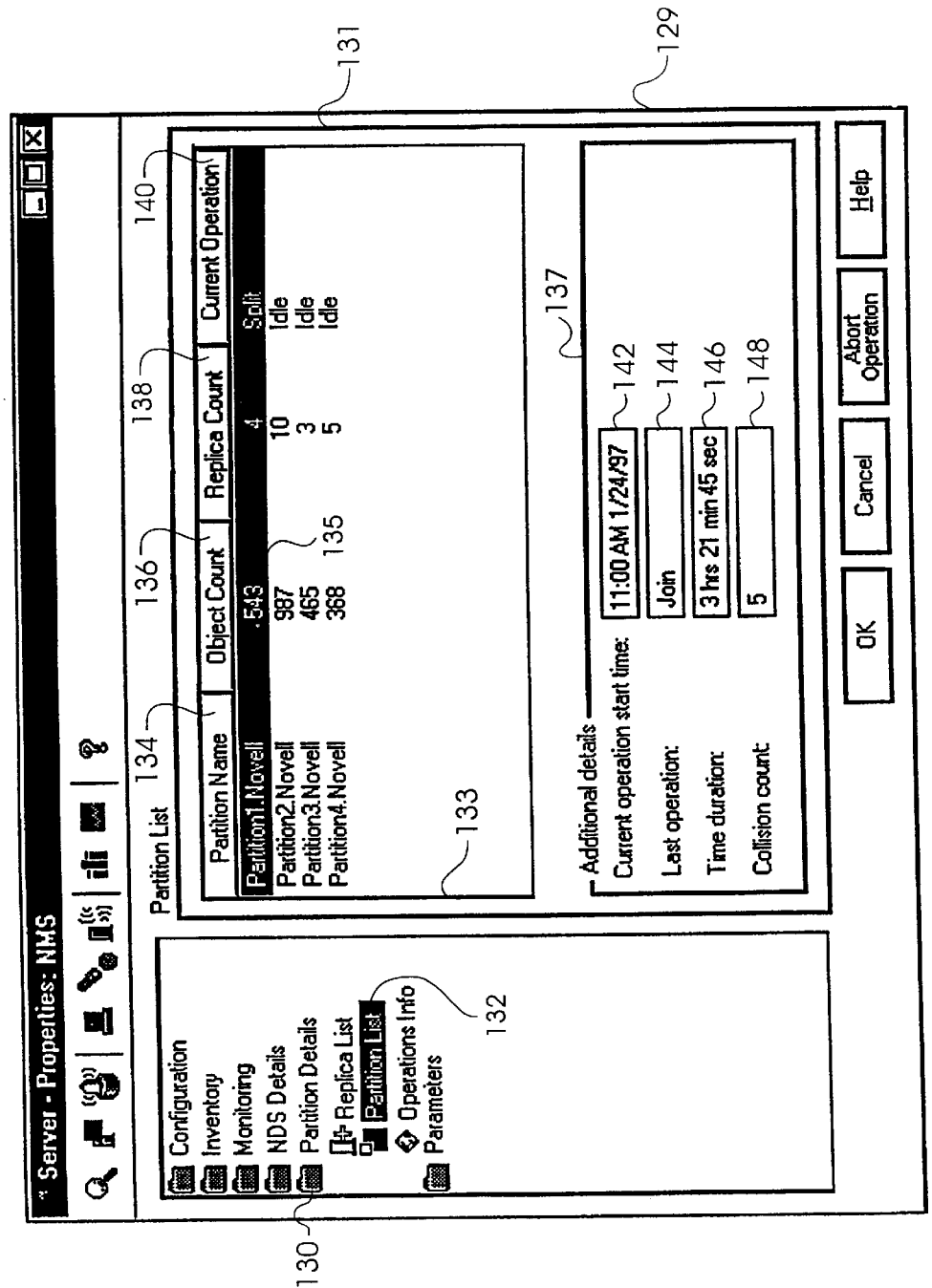
FIG. 10 is a user interface window showing partition information obtained from the MIB according to one embodiment of this invention.

FIG. 10 shows a user interface window 129. Selecting item 132 of folder 130 results in the information in window 131 being displayed. Window 131 displays information about the partitions on managed server 58. The information in window 131 can be obtained from partition table object 92. Box 133 lists the names and other attributes of each of the partitions on managed server 58. This information can be obtained by accessing partition table object 92 and extracting from each row, or sequence, of objects relevant information about each partition. For example, the names of the partitions in column 134 can be obtained from the partition name object of each row in partition table object 92, and the number of objects in column 136 can be obtained from the object count object of each row of partition table object 92. The number of replicas in column 138 can be obtained from the replica per partition count object of each row of partition table object 92, and the current operation in column 140 can be obtained from the current operation object of each row of partition table object 92.

Upon highlighting a particular partition name 135 in box 133, additional partition information relating to the selected partition can be provided, as shown in window 137. Field 142 contains the start time and date of the current operation being performed on the selected partition. This information can be obtained from the current operation start date time object from the row of partition table object 92 relating to the selected partition. Field 144 contains the last operation which was performed on the selected partition. This information can be obtained from the last successful partition operation object of partition table object 92. Field 146 contains the duration of the last partition operation. This information can be obtained from the last successful partition operation start date time object and the successful partition operation stop date time object. Field 148 contains the number of collisions which has occurred on the selected partition. This information comes from the collision count object of partition table object 92. The information in fields 142, 144, 146 and 148 will change as each respective partition listed in box 133 is selected.

Figure 11:
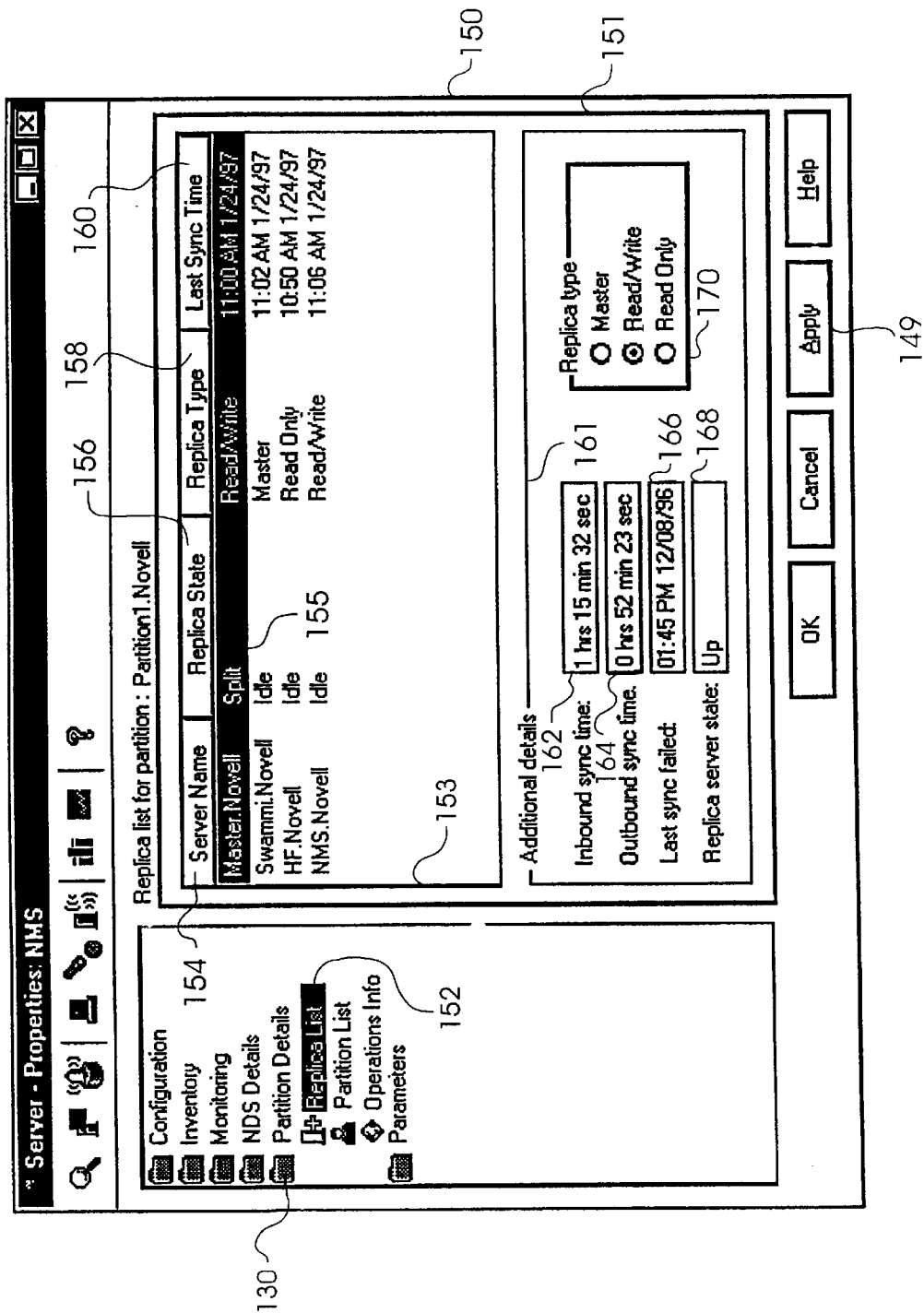
FIG. 11 is a user interface window showing replica information relating to a partition shown in FIG. 10.

FIG. 11 shows a user interface window 150. Upon selection of item 152 of folder 130, window 151 displays information relating to the replicas associated with a particular partition. For example, box 153 contains a list of the replicas associated with the partition which was selected in FIG. 10. The replica information displayed in box 153 is obtained by traversing replica table object 93 and for each row, or sequence, in the replica table which relates to the selected partition, extracting information from the objects in that row. For example, the replica server name information shown in column 154 can be obtained by indexing the nwDSReferencedServerTable object with the Replica Server ID object obtained from the appropriate row of the Replica Table object, and extracting the server name from the nwDSServerName object. The replica state information shown in column 156 can be obtained from the replica state object in replica table 93. The replica type information shown in column 158 comes from the replica type object of replica table 93. The last sync time information shown in column 160 comes from the replica successful sync date time object in replica table 93.

As a replica is highlighted in box 153, such as replica 155, additional information about that selected replica can be provided, such as shown in box 161. Field 162 contains the last inbound synchronization time. This information can be obtained from the inbound sync time object in the row of replica table object 93 associated with the selected replica. Field 164 contains the outbound sync time. This information can be obtained from the outbound sync object of replica table object 93. Field 166 contains the date and time of the last synchronization failure. This information can be obtained from the replica fail sync date time object. Field 168 contains the current server state of the selected replica. This information can be obtained from the replica server state object of replica table object 93. Field 170 contains the replica type of the selected replica. This information can be obtained from the replica type object of replica table object 93. An administrator can change the type of replica by selecting one of the radio buttons presented in box 170 and activating button 149. Upon doing so, the appropriate object in replica table object 93 will be changed to reflect the new type of replica, and directory service 62 will be prompted to take the appropriate action.

Figure 12:
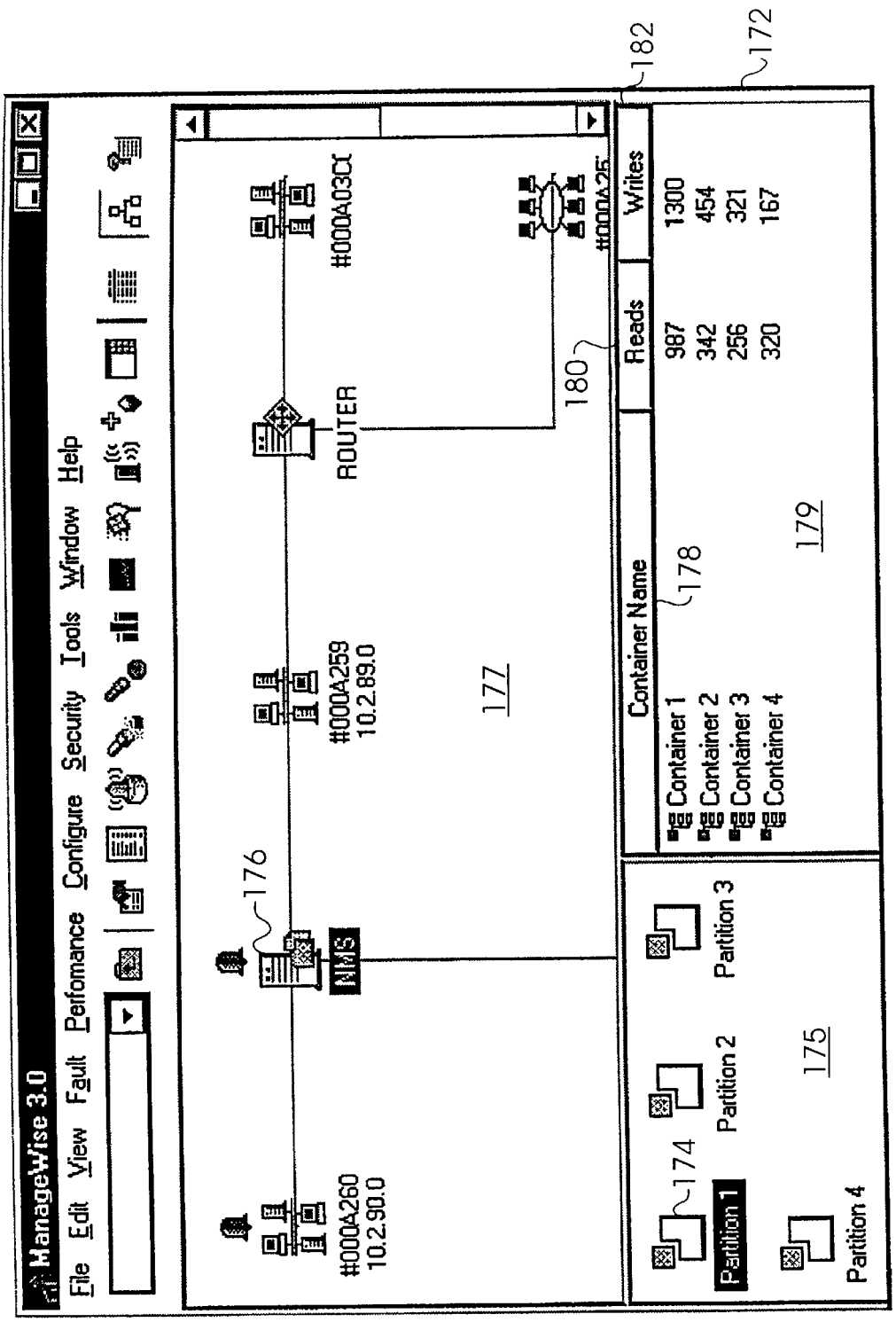
FIG. 12 is a user interface window showing container usage information relating to a partition shown in FIG. 11.

FIG. 12 shows a user interface window 172. Window 172 contains three separate windows 175, 177 and 179. Window 177 contains a graphical display of icons which represent the various components in a network. Upon selecting a server icon, such as icon 176, window 175 displays one or more partition icons which represent each partition located on the selected server. This information can be obtained from partition table object 92. Upon selection of one of the displayed partitions, such as for example partition 174, window 179 displays a list of the containers on the selected partition. The container information shown in window 179 can be obtained from the container usage table object 97 of server info object 90. Directory service 62 offers an API which translates a container ID into the partition name in which the container is located. Column 178 contains the name of each container in the selected partition. This information can be obtained from container usage table object 97. Column 180 contains the number of times each container has been read since directory service 62 was initiated. This information can be obtained from the container read operations object from the row associated with that container. Column 182 contains the number of times a write operation has been performed against the selected container. This information can be obtained from the container write operations object of the row associated with that container. Container usage information can be used by an administrator for load balancing and determining which containers are most heavily accessed.

Figure 13:
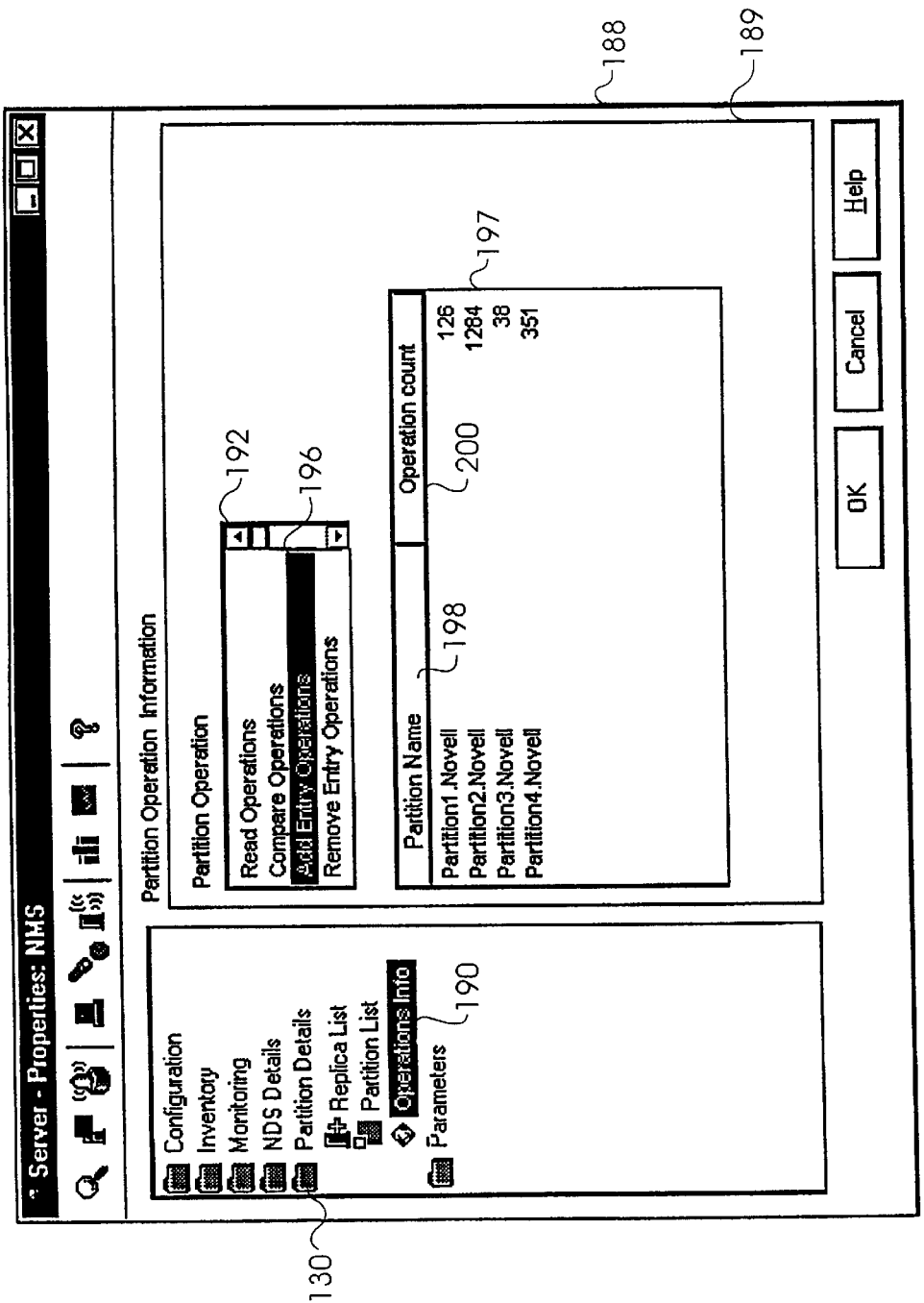
FIG. 13 is a user interface window showing partition operation information on a partition-by-partition basis.

FIG. 13 shows a user interface window 188. Upon selection of item 190 of folder 130, window 189 displays list box 192 with a plurality of partition operation selection items. Upon selection of a particular partition operation, such as item 196, window 197 displays the selected information on a partition basis. For example, column 198 displays the name of each partition on the managed server, and column 200 displays the statistics for the selected partition operation for each displayed partition name. This information can be obtained from partition operations table object 95. Thus, window 188 allows an administrator to monitor relevant directory service operations on a partition-by-partition basis.

The method and system according to this invention allows individuals using standard network management software to view or set the internal variables of a complex distributed directory service product. Moreover, immediate feedback regarding changes made to the directory can be obtained. This can be accomplished without special purpose software which is written to a proprietary interface.

Another relatively important aspect of directory service administration relates to the ability to determine what is dynamically occurring within the directory service. Some directory service products allow external software to register with the directory service and request that the external software be notified upon the occurrence of certain internal directory service events. To allow access to such events, conventional directory services usually define a proprietary event interface to which the external software must write to obtain access to such events. One problem with such proprietary interfaces is that the external software is then "tied" to that particular directory service and cannot be easily modified for use with other directory services. Referring again to FIG. 2, and as discussed above, the method and system according to this invention provides an event interface which uses the standard SNMP interface to provide event notification. Such events are implemented as SNMP traps.

Access to internal events of directory service 62 via traps can be helpful in a variety of ways. For example, the occurrence of certain traps may indicate that problems are, or are about to, occur. Rapid administration of the directory service after notification of such traps may diminish the severity of the effects of the problem. Other traps may be useful for an external software program which, for example, needs to stay synchronized with the internal state of directory service 62. Traps associated with internal events can also be used by an administrator in monitoring the overall state of directory service 62.

Referring again to FIG. 2, as is understood by those skilled in the art, spontaneous transmission of a trap from agent 70 to management station 80 is only one mechanism for communicating such information to management station 80. Another mechanism is for agent 70 to retain the trap information and await to be polled by management station 80. Upon being polled, agent 70 communicates the trap, such as trap 77, to management station 80. Upon reception of trap 77, management station 80 can indicate an alarm in a display window, or perform some action, such as initiating a program. Such programs might be used to further analyze and/or rectify the problem identified by trap 77. Agent 70 can also be configured to communicate trap 77 to other software programs, such as third party program 79 which may use trap 77 to synchronize its internal state with events occurring within directory service 62. Agent 70 can implement any suitable event occurring within directory server 62 as a trap. An example of such traps can include partition traps which provide management station 80 information relating to partition operations, such as a completed partition split trap which is operative to provide information relating to the completion of a split partition operation, and a completed partition join trap which is operative to provide information relating to the completion of a joined partition operation.

Trap 77 could also comprise a variety of replica traps operative to provide the management station with information relating to replica operations, including an add replica trap operative to provide information relating to the addition of a new replica, and a remove replica trap operative to provide information relating to the removal of a replica. It is apparent that the use of such information could be very valuable to management station 80 and/or other software systems. The traps defined in MIB 71 according to one embodiment of this invention are disclosed in the attached microfiche. For the sake of illustration, certain traps defined in MIB 71 will be discussed herein in greater detail.

Referring to FIG. 3, according to one embodiment of this invention, the traps implemented in trap module 74 can be located at trap node 87 at location 1.3.6.1.4.1.23.2.34 in the hierarchy of the MIB tree. Under this node, a plurality of objects having object identifiers in the form '1.3.6.1.4.1.23.2.34.n' are preferably defined for use with the various traps. Examples of such objects are:

```
TrapTime    OBJECT-TYPE
            SYNTAX        INTEGER (0..4294967295)
            ACCESS        not-accessible
            STATUS        mandatory
            DESCRIPTION
                "The total number of seconds since midnight
                (12 am) of 1 January 1970 GMT (UT)."
            ::= { TrapInfo 1 }
EventType   OBJECT-TYPE
            SYNTAX        INTEGER (0..4294967295)
            ACCESS        not-accessible
            STATUS        mandatory
            DESCRIPTION
                "The event type that was reported by the NDS
                Event system."
            ::= { TrapInfo 2 }
Result      OBJECT-TYPE
            SYNTAX        INTEGER (0..4294967295)
            ACCESS        not-accessible
            STATUS        mandatory
            DESCRIPTION
                "The result code of a particular NDS operation.
                The constant that is associated with this
                integer is defined in nwdserr.h."
            ::= { TrapInfo 3 }
```

The traps each have an object identifier of 1.3.6.1.4.1.23.2.34 and are distinguished from each other by a specific trap number.

It is apparent that the directory service objects could be implemented in a separate MIB from the trap objects. Thus, object module 72 could be implemented in one MIB, and trap module 74 implemented in a second MIB.

When a remote directory service server is down, performance can be degraded and it would frequently be useful to be aware of this condition so the remote server can be fixed. Notification of such an event can be provided with a RemoteServerDown trap which can then be communicated to management station 80 notifying the administrator of the situation. The formal ASN.1 definition of a RemoteServerDown trap is as follows:

```
TRAP-TYPE
ENTERPRISE ndsTrap-MIB
VARIABLES
    {
        ndsTrapTime,
        ndsEventType,
        ndsResult,
        ndsTransportAddressType,
        ndsTransportAddress
    }
DESCRIPTION
    "Remote NDS server down"
    ::= 16
```

Communication between server computers and client computers in most network operating systems is accomplished through the use of packets transmitted over the network. When the number of packet retries exceeds a threshold limit, this is usually an indication that a problem exists either with the server or the client computer. Upon exceeding the threshold, a NCPRetryExpended trap can be communicated to management station 80 to notify an administrator that a network problem exists. The formal ASN.1 syntax is as follows:

```
TRAP-TYPE
ENTERPRISE ndsTrap-MIB
VARIABLES
    {
        ndsTrapTime,
        ndsEventType,
        ndsResult,
        ndsTransportAddressType,
        ndsTransportAddress
    }
DESCRIPTION
    "nds client NCP retries exceeding threshold"
    ::= 17
```

Each copy of a partition is referred to as a replica. Each partition must have at least one replica. Deleting all but the final copy of a replica results in a lack of redundancy, and may indicate an operator error. Upon deleting the second-to-last copy of a replica, a OneReplica trap can be sent to management station 80 to warn an administrator about such a lack of redundancy. The formal ASN.1 syntax for the OneReplica trap is as follows:

```
TRAP-TYPE
ENTERPRISE ndsTrap-MIB
VARIABLES
    {
        ndsTrapTime,
        ndsEventType,
        ndsResult,
        ndsPerpetratorName,
        ndsProcessID,
        ndsConnID,
        ndsVerbNumber,
        ndsEntryName
    }
DESCRIPTION
    "Only one replica"
    -- ndsEntryName = Partition name
    ::= 41
```

During the synchronization process, objects having identical names will cause a collision. Upon such a collision, a NameCollision trap can be sent to management station 80 to warn an administrator that a collision occurred, and one of the two objects was automatically renamed. The formal ASN.1 syntax for the NameCollision trap is as follows:

```
                TRAP-TYPE
                ENTERPRISE ndsTrap-MIB
                VARIABLES
                {
                    ndsTrapTime,
                    ndsEventType,
                    ndsResult,
                    ndsPerpetratorName,
                    ndsProcessID,
                    ndsConnID,
                    ndsVerbNumber,
                    ndsEntryName,
                    ndsEntryName2
                }
                DESCRIPTION
                "NDS name collision"
                -- ndsEntryName = Original entry name
                -- ndsEntryName2 = Dulicate entry name
                --#TYPE "NDS: name collision"
                --#SUMMARY "Name collision %s and %s"
                --#ARGUMENTS {7,8}
                --#SEVERITY MAJOR
                --#TIMEINDEX 0
                --#HELP "ndstrap.hlp"
                --#HELPTAG 56
                --#STATE DEGRADED
                ::= 56
```

Important events occurring in directory service 62 may justify notification even though such events do not represent problems. For example, upon the merger of two directory trees, a MergeTree trap object can be sent to management station 80 to notify an administrator that two directory service trees are being merged. Upon a reload of directory service 62 a ReloadDS trap can be sent to management station 80 to notify an administrator that the directory service has reloaded. Upon a password change operation associated with a directory object, a ChangePassword trap can be sent to management station 80 to notify an administrator of such a password change. The formal ASN.1 syntax for these traps is as follows:

```
ndsMergeTree        TRAP-TYPE
                    ENTERPRISE ndsTrap-MIB
                    VARIABLES
                    {
                        ndsTrapTime,
                        ndsEventType,
                        ndsResult,
                        ndsPerpetratorName,
                        ndsProcessID,
                        ndsConnID,
                        ndsVerbNumber,
                        ndsEntryName,
                        ndsEntryName2
                    }
                    DESCRIPTION
                    "Merge a tree ndsEntryName2) into another tree
                        (ndsEntryName2)"
                    --#TYPE "NDS: Merge trees"
                    --#SUMMARY "Merge trees %s and %s"
                    --#ARGUMENTS {7, 8}
                    --#SEVERITY MAJOR
                    --#TIMEINDEX 0
                    --#HELP "ndstrap.hlp"
                    --#HELPTAG 97
                    --#STATE DEGRADED
                    ::= 97
ndsReloadDS         TRAP-TYPE
                    ENTERPRISE ndsTrap-MIB
                    VARIABLES
                    {
                        ndsTrapTime,
                        ndsEventType,
                        ndsResult,
                        ndsPerpetratorName,
                        ndsProcessID,
                        ndsConnID,
                        ndsVerbNumber,
                        ndsEntryName
                    }
                    DESCRIPTION
                    "Reload DS"
                    -- ndsEntryName = Tree root name
                    --#TYPE "NDS: Reload DS"
                    --#SUMMARY "%s reload DS"
                    --#ARGUMENTS {3}
                    --#SEVERITY MAJOR
                    --#TIMEINDEX 0
                    --#HELP "ndstrap.hlp"
                    --#HELPTAG 116
                    --#STATE OPERATIONAL
                    ::= 116
ndschangePassword   TRAP-TYPE
                    ENTERPRISE ndsTrap-MIB
                    VARIABLES
                    {
                        ndsTrapTime,
                        ndsEventType,
                        ndsResult,
                        ndsPerpetratorName,
                        ndsProcessID,
                        ndsConnID,
                        ndsVerbNumber,
                        ndsEntryName
                    }
                    DESCRIPTION
                    "Changing Password"
                    --#TYPE "NDS: Password changed"
                    --#SUMMARY "%s change %s password"
                    --#ARGUMENTS {3, 7}
                    --#SEVERITY MINOR
                    --#TIMEINDEX 0
                    --#HELP "ndstrap.hlp"
                    --#HELPTAG 67
                    --#STATE OPERATIONAL
                    := 67
```

The foregoing description of preferred embodiments of the invention has been presented for purposes of illustration and description. It is not intended to be exhaustive or to limit the inventions to the precise fonn disclosed. Obvious modifications or variations are possible in light of the above teachings. The embodiments were chosen and described in order to best illustrate the principals of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for managing a directory service, comprising:
    defining a first plurality of objects operative to maintain information about a plurality of partitions in a MIB;
    implementing the MIB in an agent;
    loading the agent on a managed server;
    interfacing the agent with a directory service operative to perform at least one of a directory split partition, a directory join partition and a directory replica;
    sending management request from a management station to the agent to access one of the objects.

2. A method according to claim 1, further comprising collecting a second plurality of objects operative to maintain information about replicas associated with the plurality of partitions.

3. A method according to claim 2, wherein the first plurality of objects comprise a plurality of partition operation objects, each partition operation object being operative to maintain information identifying the last successful partition operation completed against a respective partition, and a plurality of current operation objects, each current operation object being operative to maintain information identifying a current operation being performed on a respective partition.

4. A method according to claim 3, further comprising a partition table object, wherein the partition table object is operative to maintain a plurality of rows for maintaining information about respective partitions on the managed server, each row containing one of the partition operation objects and one of the current operation objects.

5. A method according to claim 4, wherein each row further comprises a replica count object operative to maintain a count of the number of replicas of a respective partition, a counter object operative to maintain the number of objects maintained in the respective partition, and a collision object operative to maintain a count of the number of collisions on the respective partition.

6. A method according to claim 2, wherein the second plurality of objects comprise a plurality of replica state objects, each replica state object being operative to maintain a state of the respective replica, and a plurality of replica type objects, each replica type object being operative to maintain a type of the respective replica.

7. A method according to claim 6, further comprising a replica table object, wherein the replica table object is operative to maintain a plurality of rows, each row being operative to maintain information for a respective replica and including one of the replica state objects and one of the replica type objects.

8. A method according to claim 7, wherein each row further comprises a partition identifier object operative to identify a partition on the managed server associated with the respective replica, and a replica server status object operative to maintain information identifying a status of a server on which the respective replica exists.

9. A method according to claim 2 further comprising a partition table object, wherein the partition table object is operative to maintain a plurality of rows for maintaining information about respective partitions on the managed server, each row containing one of the partition operation objects and one of the current operation objects, and a replica table object, wherein the replica table object is operative to maintain a plurality of rows, each row being operative to maintain information for a respective replica and including one of the replica state objects and one of the replica type objects.

10. A method according to claim 9, wherein the sending step comprises sending the management request to access the partition table object, further comprising accessing the partition table object, and for each row in the partition table object, returning to the management station information from at least one object in each row about a respective partition, and displaying the returned information on a display device.

11. A method for providing to a management station operational information related to a distributed directory on a managed server, comprising:

associating an agent with a managed server, the agent implementing an information base including a partition table operative to maintain partition information about each partition on the managed server;

interfacing the agent with a directory service module operative to perform at least one of a directory split partition, a directory join partition, and a directory replica, and associated with the managed server;

and sending a request to the agent to access the partition table.

12. A method according to claim 11, wherein the information base further comprises a container usage table operative to maintain container usage information about each container object in each partition on the managed server.

13. A method according to claim 12, wherein the partition information is maintained in the form of a first plurality of objects, the partition table has a row of the first plurality of objects for each respective partition on the managed server, and wherein the first plurality of objects comprises a replica count object being operative to maintain a count of the number of replicas associated with a respective partition, and a current operation object being operative to maintain information identifying a current operation being performed on the respective partition.

14. A method according to claim 13, wherein the container usage information is maintained in the form of a second plurality of objects, the container usage table has a row of the second plurality of objects for each respective object maintained in a partition on the managed server, and wherein the second plurality of objects comprises a write operations object operative to maintain a count of write accesses performed against the respective object, and a read operations object operative to maintain a count of read accesses performed against the respective object.

15. A system for managing a distributed directory, comprising:

a data communications link;

an interface to a distributed directory service;

an agent implementing an information base, the agent being operative to interface with the distributed directory service via the interface wherein the distributed directory service is operative to perform at least one of a directory split operation, a directory join partition, and a directory replica, and being operative to communicate with a management station via the data communications link;

the agent being operative to access the first plurality of objects upon request from the management station.

16. A method according to claim 15, wherein the information base further comprises a second plurality of objects operative to maintain information about a plurality of replicas associated with the plurality of partitions.

17. A method according to claim 16, wherein the first plurality of objects comprise a plurality of partition operation objects, each partition operation object being operative to maintain information identifying the last successful partition operation completed against a respective partition, and a plurality of current operation objects, each current operation object being operative to maintain information identifying a current operation being performed on a respective partition.

18. A method according to claim 17, further wherein the information base further comprises a partition table object, and wherein the partition table object is operative to maintain a plurality of rows for maintaining information about respective partitions on the managed server, each row containing one of the partition operation objects and one of the current operation objects.

19. A method according to claim 18, wherein the second plurality of objects comprise a plurality of replica state objects, each replica state object being operative to maintain a state of the respective replica, and a plurality of replica type objects, each replica type object being operative to maintain a type of the respective replica, the information base further comprising a replica table object, the replica table object begin operative to maintain a plurality of rows, each row being operative to maintain information for a respective replica and including one of the replica state objects and one of the replica type objects.

20. A method for obtaining access to internal events associated with a directory service on a managed server, comprising:

defining a plurality of trap objects in a MIB, each trap object being associated with a directory service event;

implementing the MIB in an agent;

loading the agent on a managed server;

interfacing the agent with a directory service wherein the directory service is operative to perform at least one of a directory split operation, a directory join partition, and a directory replica; and communicating at least one of the traps to an external software program.

21. A method for managing a directory service, comprising:

defining a first plurality of objects operative to maintain information about a plurality of partitions in a MIB;

implementing the MIB in an agent;

loading the agent on a managed server;

interfacing the agent with a directory service; and sending a management request from a management station to the agent to access one of the objects; and defining a plurality of partition traps in the MIB operative to provide the management station with information relating to partition operations, including a completed partition split trap operative to provide information relating to the completion of a split partition operation, and a completed partition join trap operative to provide information relating to the completion of a join partition operation.

22. A method for managing a directory service, comprising:

defining a first plurality of objects operative to maintain information about a plurality of partitions in a MIB;

implementing the MIB in an agent;

loading the agent on a managed server;

interfacing the agent with a directory service;

sending a management request from a management station to the agent to access one of the objects; and defining a plurality of replica traps in the MIB operative to provide the management station with information relating to replica operations, including an add replica trap operative to provide information relating to the addition of a new replica, and a remove replica trap operative to provide information relating to the removal of a replica.

23. A method for obtaining access to internal events associated with a directory service on a managed server, comprising:

defining a plurality of trap objects in a MIB, each trap object being associated with a directory service event, wherein the trap objects defined in the MIB comprise a completed partition split trap operative to provide information relating to the completion of a split partition operation, and a completed partition join trap operative to provide information relating to the completion of a join partition operation;

implementing the MIB in an agent;

loading the agent on a managed server;

interfacing the agent with a directory service; and communicating at least one of the traps to an external software program.

24. A method for obtaining access to internal events associated with a directory service on a managed server, comprising:

defining a plurality of trap objects in a MIB, each trap object being associated with a directory service event, wherein the trap objects defined in the MIB comprise a completed partition split trap operative to provide information relating to the completion of a split partition operation, and a completed partition join trap operative to provide information relating to the completion of a join partition operation, the trap objects defined in the MIB further comprising an add replica trap operative to provide information relating to the addition of a new replica, and a remove replica trap operative to provide information relating to the removal of a replica;

implementing the MIB in an agent;

loading the agent on a managed server;

interfacing the agent with a directory service; and communicating at least one of the traps to an external software program.

25. A method for obtaining access to internal events associated with a directory service on a managed server, comprising:

defining a plurality of trap objects in a MIB, each trap object being associated with a directory service event, wherein the trap objects defined in the MIB comprise a completed partition split trap operative to provide information relating to the completion of a split partition operation, and a completed partition join trap operative to provide information relating to the completion of a join partition operation, the trap objects defined in the MIB further comprising an add replica trap operative to provide information relating to the addition of a new replica, and a remove replica trap operative to provide information relating to the removal of a replica;

implementing the MIB in an agent;

loading the agent on a managed server;

interfacing the agent with a directory service; and communicating at least one of the traps to an external software program, wherein the external software program comprises management station software.

* * * * *

UNITED STATES PATENT AND TRADEMARK OFFICE
CERTIFICATE OF CORRECTION

PATENT NO.    :  6,052, 724
DATED         :  April 18, 2000
INVENTORS     :  David J. Willie, et al It is certified that error appears in the above-identified patent and that said Letters Patent is hereby corrected as shown below:

On the face of the patent, insert:

--[73] Assignee: Novell, Inc., Provo, Utah-- and

--Attorney, firm or agent: Dinsmore & Shohl LLP--

Signed and Sealed this

Twenty-fourth Day of April, 2001

Attest:

NICHOLAS P. GODICI

Attesting Officer    Acting Director of the United States Patent and Trademark Office